US012694378B2

(12) United States Patent
Lopez et al.

(10) Patent No.: US 12,694,378 B2
(45) Date of Patent: Jul. 28, 2026

(54) AUTOMATED WEB CONTENT PUBLISHING

(71) Applicant: Instasize, Inc., Sandy, UT (US)

(72) Inventors: Hector Lopez, South Jordan, UT (US);
Luca Meschiari, Miami, FL (US)

(73) Assignee: Instsasize, Inc., Sandy, UT (US)

( * ) Notice: Subject to any disclaimer, the term of this
patent is extended or adjusted under 35
U.S.C. 154(b) by 0 days.

(21) Appl. No.: 17/089,607

(22) Filed: Nov. 4, 2020

(65) Prior Publication Data

US 2022/0180452 A1     Jun. 9, 2022

Related U.S. Application Data

(60) Provisional application No. 63/037,606, filed on Jun.
11, 2020.

(51) Int. Cl.
*G06Q 10/40*          (2026.01)
*G06F 3/0482*        (2013.01)
          (Continued)

(52) U.S. Cl.
CPC ........... *G06Q 10/40* (2026.01); *G06F 3/0482*
(2013.01); *G06F 9/547* (2013.01);
          (Continued)

(58) Field of Classification Search
CPC ............... G06Q 50/01; G06Q 30/0623; G06F
16/9566; G06F 3/0482; G06F 9/547;
H04L 63/08; H04L 67/02; H04L 67/28
          (Continued)

(56) References Cited

U.S. PATENT DOCUMENTS 5,835,712  A     11/1998  Dufresne et al.
6,229,541  B1     5/2001  Kamen et al.
          (Continued)

FOREIGN PATENT DOCUMENTS

WO     WO-2014172601  A1 *  10/2014     ....... H04N 21/23412
WO     WO-2018071562  A1 *   4/2018
WO       2019171128  A1    9/2019

OTHER PUBLICATIONS

Abbott, Elisa, "How to Design Awesome Instagram Stories", Jan.
23, 2019, Storrito Blog (Year: 2019).*
          (Continued)

*Primary Examiner* — Victoria E. Frunzi
*Assistant Examiner* — Thomas Joseph Sullivan
(74) *Attorney, Agent, or Firm* — VLP Law Group, LLP;
Michael Bohn

(57)          ABSTRACT
An example method presents one or more mobile applica-
tion user interfaces and receive inputs via the one or more
mobile application user interfaces defining a story object for
a social media site. The story object comprises a plurality of
consecutive graphical pages. The method receives an input
to publish the story object as a web page and uploads the
story object to an online storage location. The method
further sends, via an API of a media publishing application,
a request to the media publishing application requesting to
publish the story object as a web page. The request includes
a user identifier of the user, a unique uniform resource
locator (URL), and one or more story publication param-
eters. The method receives notification that the web page
was published at the URL.

20 Claims, 19 Drawing Sheets

(51) Int. Cl.

| | |
|---|---|
| *G06F 9/54* | (2006.01) |
| *G06F 16/955* | (2019.01) |
| *G06Q 30/0601* | (2023.01) |
| *H04L 9/40* | (2022.01) |
| *H04L 67/02* | (2022.01) |
| *H04L 67/56* | (2022.01) |

(52) U.S. Cl.
CPC ..... *G06F 16/9566* (2019.01); *G06Q 30/0623* (2013.01); *H04L 63/08* (2013.01); *H04L 67/02* (2013.01); *H04L 67/56* (2022.05)

(58) Field of Classification Search
USPC ........................................ 705/26.61; 5/26.61
See application file for complete search history.

(56) References Cited

U.S. PATENT DOCUMENTS

| | | | |
|---|---|---|---|
| 6,701,345 B1 | 3/2004 | Carley et al. | |
| 7,013,428 B1 | 3/2006 | Kamen et al. | |
| 7,403,901 B1 | 7/2008 | Carley et al. | |
| 7,477,800 B2 | 1/2009 | Avidan et al. | |
| 8,078,963 B1 | 12/2011 | Rosner et al. | |
| 8,990,672 B1 | 3/2015 | Grosz et al. | |
| 9,135,663 B1 | 9/2015 | Heiferman et al. | |
| 9,264,462 B2 | 2/2016 | Heiferman et al. | |
| 10,033,767 B2 | 7/2018 | Pashman et al. | |
| 10,140,392 B1 | 11/2018 | Bowen | |
| 10,305,758 B1 | 5/2019 | Bhide et al. | |
| 10,325,013 B2 | 6/2019 | Mondal | |
| 10,594,774 B2 | 3/2020 | Thomas | |
| 10,742,433 B2 | 8/2020 | Whalin et al. | |
| 10,867,081 B2 | 12/2020 | Bowen | |
| 10,942,978 B1* | 3/2021 | Paul ........................ | G06Q 50/01 |
| 2002/0087352 A1 | 7/2002 | Armstrong et al. | |
| 2002/0108034 A1 | 8/2002 | Hashem et al. | |
| 2004/0001106 A1 | 1/2004 | Deutscher et al. | |
| 2004/0133598 A1 | 7/2004 | Dobrowski et al. | |
| 2005/0084232 A1 | 4/2005 | Herberger et al. | |
| 2005/0246649 A1 | 11/2005 | Wilhelm | |
| 2006/0161850 A1 | 7/2006 | Seaberg | |
| 2007/0005634 A1 | 1/2007 | Selca et al. | |
| 2007/0038567 A1 | 2/2007 | Allaire et al. | |
| 2007/0079236 A1 | 4/2007 | Schrier et al. | |
| 2008/0052163 A1 | 2/2008 | Koh | |
| 2008/0126515 A1* | 5/2008 | Chambers .............. | G06Q 30/02 |
| | | | 709/218 |
| 2008/0270358 A1 | 10/2008 | Chatow et al. | |
| 2008/0276175 A1 | 11/2008 | Kim et al. | |
| 2008/0295092 A1 | 11/2008 | Tan et al. | |
| 2009/0150758 A1 | 6/2009 | Gejdos et al. | |
| 2009/0276805 A1* | 11/2009 | Andrews, II ........... | G06Q 30/02 |
| | | | 725/38 |
| 2010/0017371 A1 | 1/2010 | Whalin et al. | |
| 2011/0072035 A1 | 3/2011 | Gaucas et al. | |
| 2011/0161130 A1 | 6/2011 | Whalin et al. | |
| 2011/0239158 A1 | 9/2011 | Barraclough et al. | |
| 2011/0280497 A1 | 11/2011 | Berger et al. | |
| 2011/0289142 A1 | 11/2011 | Whalin et al. | |
| 2011/0289433 A1 | 11/2011 | Whalin et al. | |
| 2011/0305433 A1 | 12/2011 | Singer | |
| 2012/0173976 A1 | 7/2012 | Herz et al. | |
| 2012/0179980 A1 | 7/2012 | Whalin et al. | |
| 2012/0179981 A1 | 7/2012 | Whalin et al. | |
| 2012/0277914 A1 | 11/2012 | Crow et al. | |
| 2012/0278704 A1 | 11/2012 | Ying et al. | |
| 2012/0294514 A1 | 11/2012 | Saunders et al. | |
| 2013/0211980 A1 | 8/2013 | Heiferman et al. | |
| 2013/0212494 A1 | 8/2013 | Heiferman et al. | |
| 2013/0290133 A1* | 10/2013 | Schreck .............. | G06Q 30/0633 |
| | | | 705/26.8 |
| 2014/0013217 A1 | 1/2014 | Hashii et al. | |
| 2014/0092424 A1 | 4/2014 | Grosz | |
| 2014/0096017 A1 | 4/2014 | Grosz | |

| | | | |
|---|---|---|---|
| 2014/0109046 A1 | 4/2014 | Hirsh et al. | |
| 2014/0193047 A1 | 7/2014 | Grosz et al. | |
| 2014/0195921 A1 | 7/2014 | Grosz et al. | |
| 2014/0229462 A1 | 8/2014 | Lo | |
| 2014/0278998 A1* | 9/2014 | Systrom ............. | G06Q 30/0277 |
| | | | 705/14.57 |
| 2014/0289022 A1* | 9/2014 | Kamiya ........... | G06Q 10/06398 |
| | | | 705/7.42 |
| 2015/0007132 A1 | 1/2015 | Baldwin et al. | |
| 2015/0019305 A1 | 1/2015 | Gorawala | |
| 2015/0040031 A1 | 2/2015 | Lee et al. | |
| 2015/0169580 A1* | 6/2015 | Epstein ................. | G06F 16/951 |
| | | | 707/749 |
| 2015/0205950 A1 | 7/2015 | Vayvod et al. | |
| 2015/0242374 A1* | 8/2015 | Kong .................... | G06F 40/106 |
| | | | 715/201 |
| 2015/0310520 A1 | 10/2015 | Donato et al. | |
| 2016/0092935 A1 | 3/2016 | Bradley et al. | |
| 2016/0224999 A1 | 8/2016 | Mukherjee et al. | |
| 2016/0234267 A1 | 8/2016 | Hebbar | |
| 2016/0275067 A1 | 9/2016 | Mei et al. | |
| 2016/0294762 A1 | 10/2016 | Miller | |
| 2017/0017371 A1 | 1/2017 | Hundemer et al. | |
| 2017/0056771 A1* | 3/2017 | Davis ..................... | A63F 13/47 |
| 2017/0060509 A1 | 3/2017 | Tulasi | |
| 2017/0116179 A1 | 4/2017 | Gagn-Langevin et al. | |
| 2017/0139930 A1 | 5/2017 | Maloney | |
| 2017/0160904 A1 | 6/2017 | Tene | |
| 2017/0185254 A1 | 6/2017 | Zeng et al. | |
| 2017/0185268 A1 | 6/2017 | Zeng et al. | |
| 2017/0270078 A1 | 9/2017 | Rajwat et al. | |
| 2017/0270079 A1 | 9/2017 | Rajwat et al. | |
| 2017/0315683 A1 | 11/2017 | Boucher et al. | |
| 2017/0364981 A1 | 12/2017 | Simpson et al. | |
| 2018/0018078 A1 | 1/2018 | Hundemer et al. | |
| 2018/0020034 A1 | 1/2018 | Hundemer | |
| 2018/0025371 A1 | 1/2018 | Perriman et al. | |
| 2018/0025373 A1 | 1/2018 | Perriman et al. | |
| 2018/0083894 A1 | 3/2018 | Fung | |
| 2018/0114238 A1 | 4/2018 | Treiser | |
| 2019/0004688 A1 | 1/2019 | Bowen | |
| 2020/0008652 A1 | 1/2020 | Makino | |
| 2020/0104277 A1 | 4/2020 | Maloney | |
| 2020/0104422 A1* | 4/2020 | Crisp .................... | G06F 16/904 |
| 2020/0159870 A1 | 5/2020 | Bowen | |
| 2020/0159871 A1 | 5/2020 | Bowen | |
| 2020/0160612 A1 | 5/2020 | Bowen | |
| 2020/0250735 A1* | 8/2020 | Nabers ............... | G06Q 30/0253 |
| 2021/0303112 A1* | 9/2021 | Harrison ................. | H04L 51/52 |

OTHER PUBLICATIONS

Team Hallam, "How to use Hootsuite", Jun. 13, 2017, Hallam Internet (Year: 2017).*

Zimmerman, Sue, "How to Schedule Instagram Stories With Planoly 2018 (Plan Ahead so you can Take a Break)", Dec. 10, 2018, Sue B. Zimmerman Blog (Year: 2018).*

Ko, Jane, "How I Create my Instagram Stories (+Free IG Story Templates)", Jul. 30, 2019, A Taste of KOKO Blog (Year: 2019).*

Tempest, Quinn, "Later vs. Planoly: Which Tool Should you use to Plan Your Instagram?", Jan. 29, 2019, Quinn Tempest Blog (Year: 2019).*

Piotrowski, J, et al., "Reading with Hotspots," Jun. 13, 2016, Computers in Human Behavior (Year: 2016).*

"A Comprehensive Guide to Social Commerce," Jun. 10, 2020, Meltwater (Year: 2020).*

Kleinoeder, Elise, "Does the Future of Retail Start with Social Media?" Feb. 13, 2019, Thurder:: Tech (Year: 2019).*

"Fonts, Graphics, Themes and More—Creative Markel", hllps://creativemarkel.com/, Jun. 25, 2019, 2 pages.

"RilterGrade Photoshop Actions & Lightroom Presets", hllps://fillergrade.com/, Jun. 25, 2019, 4 pages.

"Seam Carving, In Wikipedia", hllps://en.wikipedia.org/wiki/Seam_carving, May 21, 2020, 8 pages.

Rubinstein, M. , et al., "A Comparative Study of Image Retargeting", hllps://people.csail.mil.edu/mrub/papers/re!Benchmark.pdf, 2010, 9 pages.

(56) References Cited

OTHER PUBLICATIONS

Schiappa, M. , "Deeplabv3: Semantic Image Segmentation, Towards
Data Science Blog Post", hllps://lowardsdalascience.com/deeplabv3-
c5c749322ffa, Sep. 23, 2019, 7 pages.

* cited by examiner

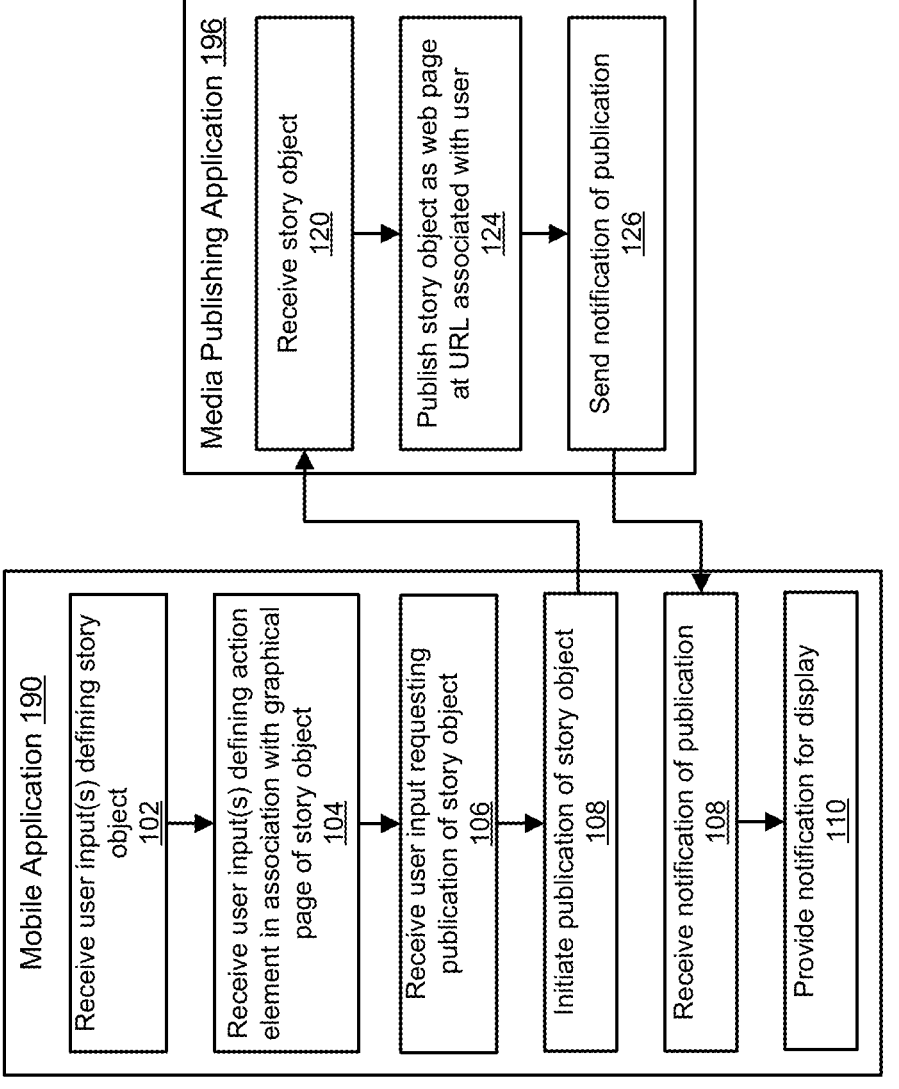
Figure 1

200

Store story object in repository
202

Generate URL for repository
204

Update database to store URL and/or story object metadata in association with user
206

Initiate publication of story object
208

Convert story object to web document(s)
210

Upload web document(s) to repository
212

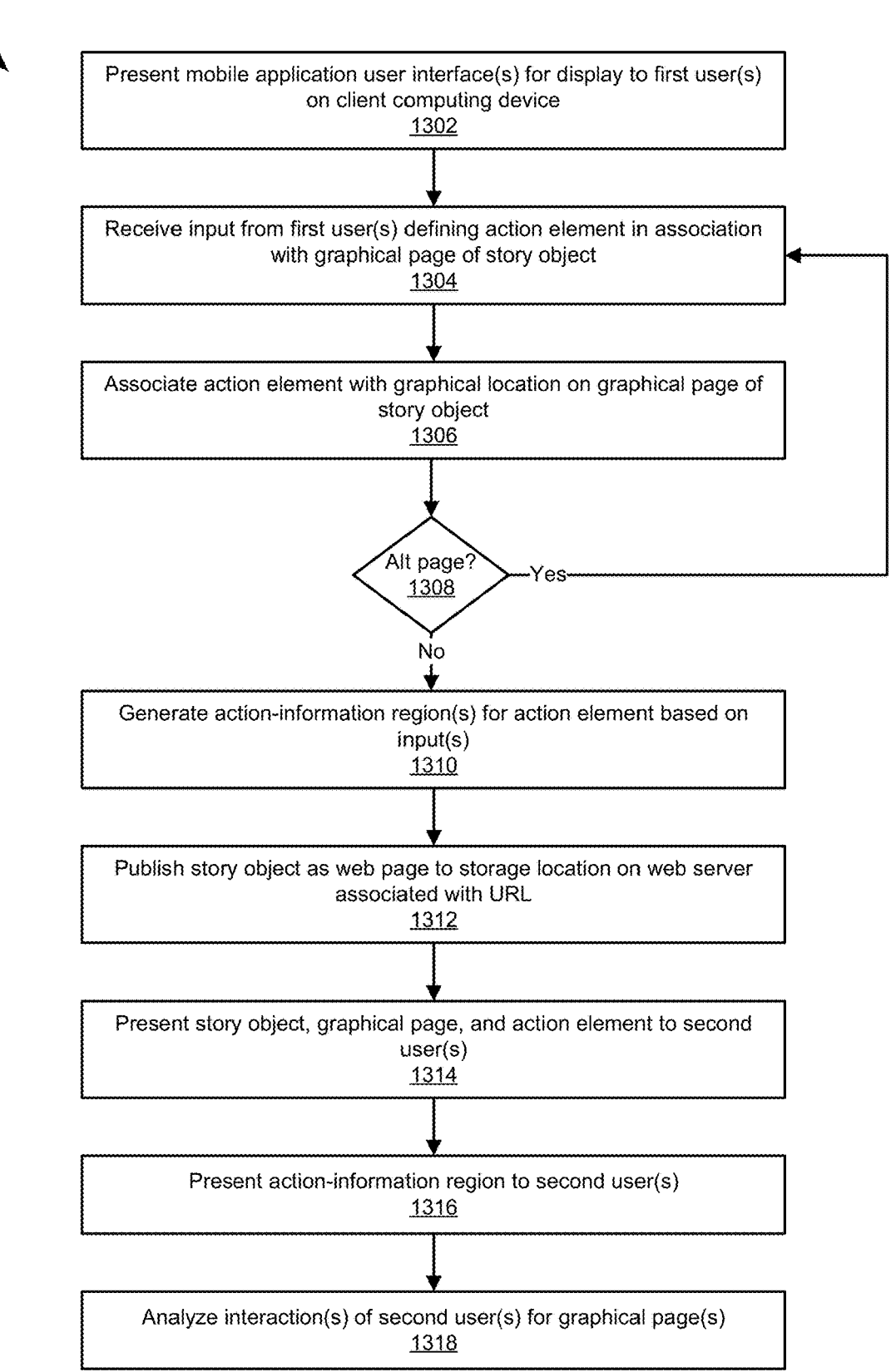

1300

Present mobile application user interface(s) for display to first user(s) on client computing device
1302

Receive input from first user(s) defining action element in association with graphical page of story object
1304

Associate action element with graphical location on graphical page of story object
1306

Alt page?
1308

Yes

No

Generate action-information region(s) for action element based on input(s)
1310

Publish story object as web page to storage location on web server associated with URL
1312

Present story object, graphical page, and action element to second user(s)
1314

Present action-information region to second user(s)
1316

Analyze interaction(s) of second user(s) for graphical page(s)
1318

A – Image
5% Success

B – Video
9% Success

Plan
Alternative Pages

1500f

Rocker Skirt

Shipping Address

Payment     5678

Purchase Summary     $32.33

---

1500e

Card Information

Card Number

MM/YY    Security Code (CVV)

⦿ Billing address same as shipping

---

1500d

• Pay Card

＋ Add Card

AUTOMATED WEB CONTENT PUBLISHING

BACKGROUND

The present application generally relates content publishing. Increasingly, when someone is looking for a product or service to buy, they start by doing online research. For example, a person may load a search engine in their web browser and perform a keyword search for products and services matching their interests or requirements. This search often involves visiting several websites of various competing businesses to find out more about the products and services, read reviews, and comparison shop.

On the other hand, businesses are faced with the challenge of developing and publishing websites, keeping it current with relevant content, engaging with their users via various marketing channels with new content, and so forth. Developing and publishing a website can be a daunting task. Most business owners do not have the requisite technical background to program or publish a website, much less figure out how to host the website. Some people turn to software vendors and pay them to develop, manage, and publish their website. However, websites managed by such software vendors often become outdated due to the cost and time spent upkeeping the web.

Other people use online services such as Wix™ and Squarespace for developing, publishing, and hosting a website. However, such services can be intimidating, time intensive, and unfamiliar, for example, to lay users. They also often require users to develop their own rich content, such as images, graphics, etc., which can further slow or impede the web development and publication process. It can also result in websites that have less-engaging content, that become out of date, or that require users to relearn how to use the software with each use.

SUMMARY

An automated web content publishing system can be configured to perform particular operations or actions by virtue of having software, firmware, hardware, or a combination of them installed on the system that in operation causes or cause the system to perform the actions. One general aspect of the system includes a method that includes: presenting one or more mobile application user interfaces to a user on a client computing device; receiving, via the one or more mobile application user interfaces, a first input defining a story object for a social media site, the story object comprising a plurality of consecutive graphical pages; receiving, via the one or more mobile application user interfaces, a second input from the user defining an action element in association with a certain graphical page of the story object; associating the action element with a graphical location on the certain graphical page of the story object; generating an action-information region for the action element based on the second input, uploading the story object to an online storage location; sending, via an API of a media publishing application, a request to the media publishing application requesting to publish the story object as a web page, the request including a user identifier of the user, a unique uniform resource locator (URL), and one or more story publication parameters; and receiving notification that the web page was published at the URL.

Some embodiments may include one or more of the following features: receiving, via the one or more mobile application user interfaces, a third input from the user defining an action element in association with a certain graphical page of the story object; associating the action element with a graphical location on the certain graphical page of the story object; generating an action-information region for the action element based on the third input, the action-information region displaying user-defined information; that publishing the story object as the web page includes converting the story object into one or more web documents, and uploading the one or more web documents to the storage location; updating a database to store the URL and story object metadata in association with the user; that the story object metadata includes a user identifier of the user, a URL, and one or more story publication parameters; that the one or more web documents have one or more formats selected from HTML, CSS, and JavaScript; that the story object comprises a JavaScript Object Notation (JSON) data file, an Extensible Markup Language (XML) data, and a Comma Separated Value (CSV) data file; receiving a request for the web page at a proxy server; determining the storage location based on the request; serving the web page from the storage location; determining a nested relationship of the web page to a previously published web page; updating the previously published web page and the web page to include corresponding links reflecting the nested relationship; updating an indexed web page to include the URL of the web page; and submitting the URL for inclusion in a web crawler index.

Some embodiments may additionally or alternatively include one or more of the following features: receiving, via the one or more mobile application user interfaces, a second input defining the story object for a social media site; receiving, via the one or more mobile application user interfaces, a third input to publish the story object as the web page; uploading the story object to the web server; receiving, via the one or more mobile application user interfaces, a fourth input from the first user defining the action element in association with a second graphical page of the story object; associating the action element with a second graphical location on the second graphical page of the story object; generating the action-information region for the action element associated with the second graphical page based on the fourth input; serving the second graphical page of the published story object to a third client computing device of a third user; providing an alternative graphical page and/or the action element and tracking inputs to the alternative graphical page; analyzing the inputs to the alternative versions of the graphical page; presenting, via the one or more mobile application user interfaces, the first graphical page and the second graphical page as alternative graphical pages of the story object, the first graphical page and the second graphical page being alternatively presented when serving the published story object; presenting, via the one or more mobile application user interfaces, a graphical representation of the analysis of the sixth input against the third input; authenticating access to the first graphical page of the published story object by the second client computing device of the second user; that the action-information region includes a gateway via which a product graphically represented at the first graphical location of the first graphical page may be acquired; that the action-information region causes one or more of redirecting a second client computing device of a second user to a separate web page, sending the product to the second user, and collecting information from the second user; that receiving the first input from the first user defining the action element in association with the first graphical page of the story object includes receiving identifying information of a product and the first graphical location of the action element relative to a content item on the first graphical page; and that generating the action-information region for the action element includes automatically generating an affiliate link to an affiliate website for the product, the action-information region including the identifying information of the product and providing a selectable element that activates the affiliate link.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 1 is a flow diagram of an example method for creating and publishing a story-based object as a web page.

FIG. 13 is a flow diagram of an example method for modifying a graphical page of a story object to include an action element and/or action-information region.

FIGS. 15A-15J illustrate example graphical user interfaces for displaying an action element and associated action-information graphical region on a client computing device.

DESCRIPTION

Figure 2:
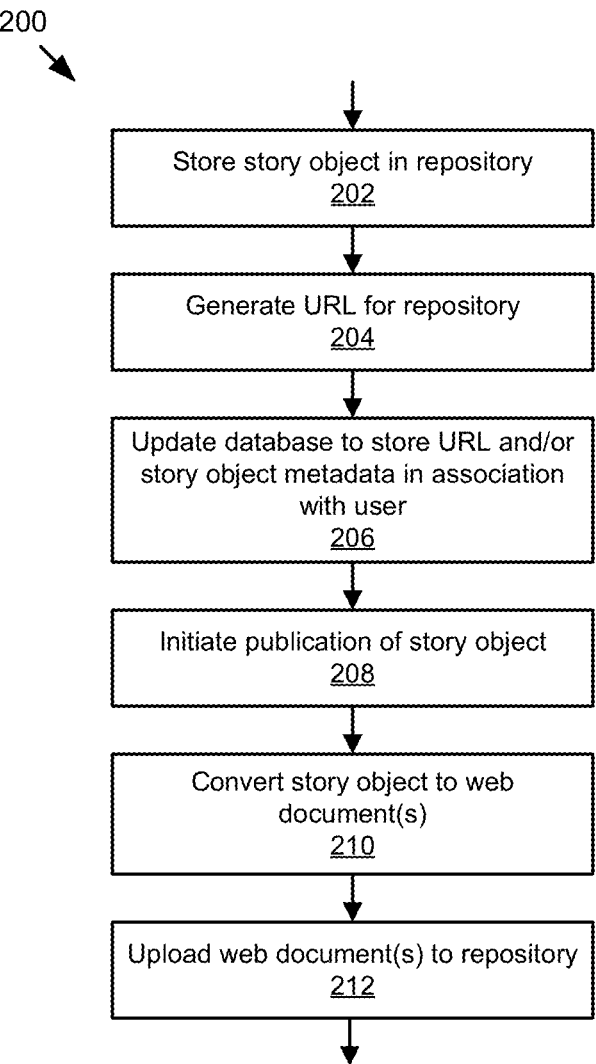
FIG. 2 is a flow diagram of an example method for publishing the story object.

The innovative technology disclosed herein provides a content management platform that allows users to easily publish graphically rich websites on a mobile device using novel workflows.

By way of example and not limitation, the technology may present mobile application user interface(s) and may receive inputs via the interface(s) that define a content item, such as a story object, as described below. For example, the interface(s) may provide the user with available templates that specify the structure and the representation of various components in the content item. This feature can advantageously simplify the process of creating the content item, especially in cases where the content item has a complicated structure and/or could otherwise require a relatively large amount of designing and/or editing.

For example, the content item may include multiple content segments or content items, such as graphical pages, images, videos, etc., and the user may define specific content, style, look and/feel, etc., to each content segment. The technology described herein allows users to quickly add content segments, such as pages, and easily add graphical content to those pages by capturing photos via their mobile device's camera. The technology may allow a user to access digital photos, videos, or other media from one or more connected digital libraries (e.g., camera roll, curated content library, etc.), apply and/or configure templates, apply and/or configure enhancing content, such as borders, shapes, text, graphics, and filters, etc., for example, from a persistent user experience. A story object may be formatted as an object suitable for upload to a social media site, such as Instagram™, TikTok™, Facebook™, etc., for publishing.

A story object may comprise a plurality of consecutive content items, such as graphical pages, which may include images, videos, text, or other digital media. For example, the consecutive graphical pages may provide a narrative for a topic, a business, an event, an experience, etc. The technology may receive an input, via a mobile device and mobile interface(s), to publish the story object as a web page. The technology may upload the story object to an online storage location and send, via an API of a media publishing application, a request to the media publishing application requesting to publish the story object as a web page. The mobile application 190 may receive a notification that the web page was published at the URL and present the notification to the user.

Further non-limiting examples and implementations are described herein with reference to the figures. In the figures, reference numbers may be used to refer to components found in any of the figures, regardless whether those reference numbers are shown in the figures being described. Further, where a reference number/numeral includes a suffix (e.g., a, b, c, n, etc.) the reference number may be used without the suffix to refer to one or all of the similar components.

FIG. 1 illustrates an example method 100 for creating and publishing a story-based object (also referred to as a story object herein) as a web page. In some implementations, the method 100 may be performed by a management server 194, instances of a media publishing application 196, and/or a converter 192 that are implemented on user device(s) 920 and/or the management server 194. It should be understood that each of these components 192, 194, and/or 196 may fully or partially perform the acts and/or functionalities described herein, and these components 192, 194, and/or 196 may be implemented in one or more computing entities of the system 900, although other implementations are possible.

In some implementations, a user (e.g., a business owner) may create a story object using an instance of the media publishing application 196, which may be a mobile application 190 (e.g., an instance or component of the media publishing application 196 executed on a mobile client computing device, such as a smartphone or tablet computer), by combining pages, slides, or other content items, and posting the story object as a web page at an online location associated with the user. In some further implementations, the story object may also be postable (e.g., as an ephemeral sequence of slides) on a social media site, such as Snap™, Instagram™ Facebook™, Pinterest™, Houzz™, etc.

In block 102, a client-side instance of the media publishing application 196 (e.g., mobile application 190) may receive one or more user inputs defining the story object from a user of the mobile application 190. In some implementations, the story object may include a plurality of sequential pages or content items. In some implementations, each page may have a similar thematic style with different content, such as different graphical static or moving images (e.g., photos, videos, etc.). The thematic style may be user-defined or based on a user-selectable template. In some further implementations, one or more sequential pages of the story object may have differing thematic styles, which may be user-defined and/or template-based.

Figures 3, 4, 5:
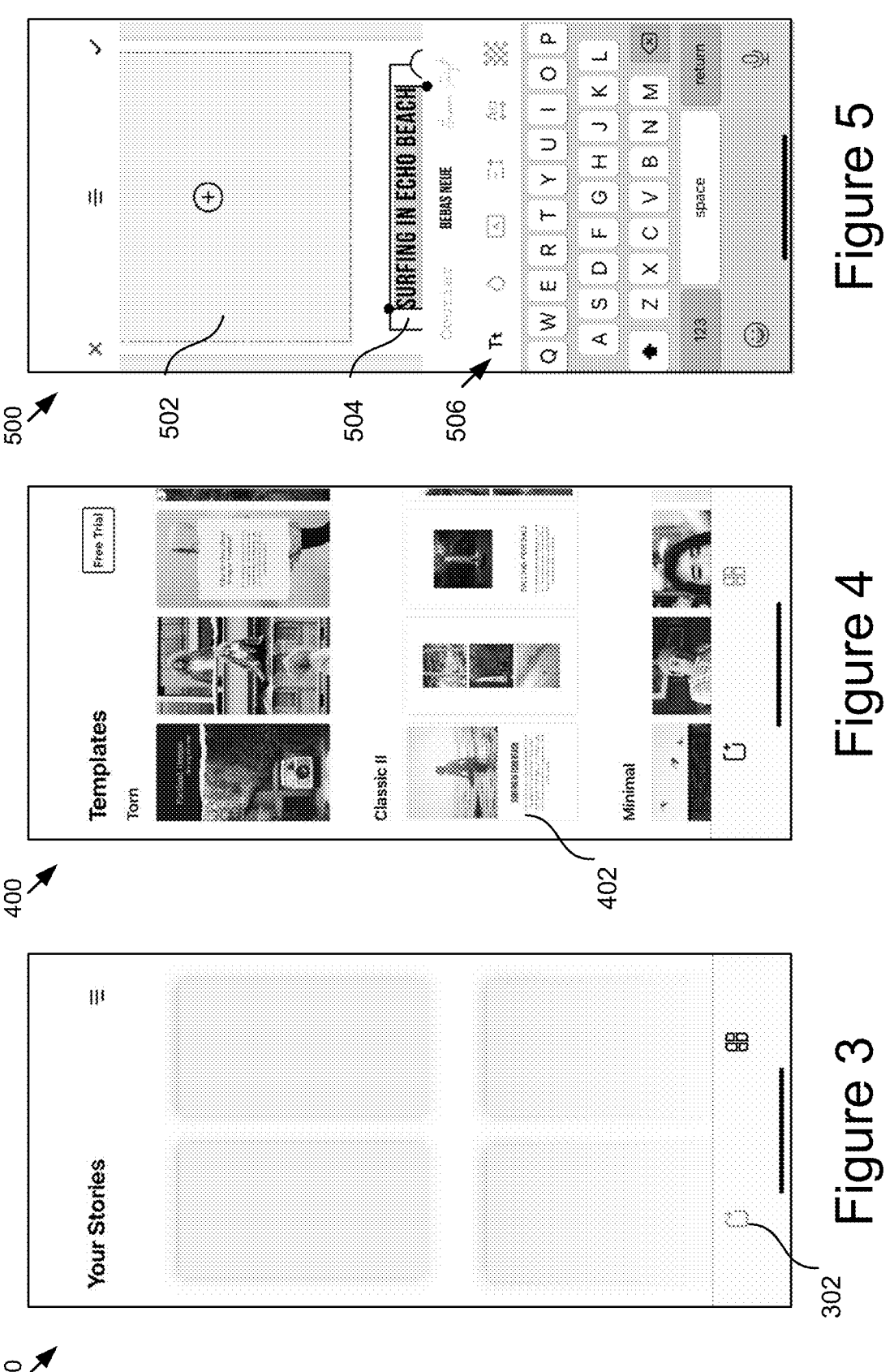
FIGS. 3-8 illustrate example graphical user interfaces for defining components, such as graphical pages, of a story object.
Figures 6A, 6B, 6C:
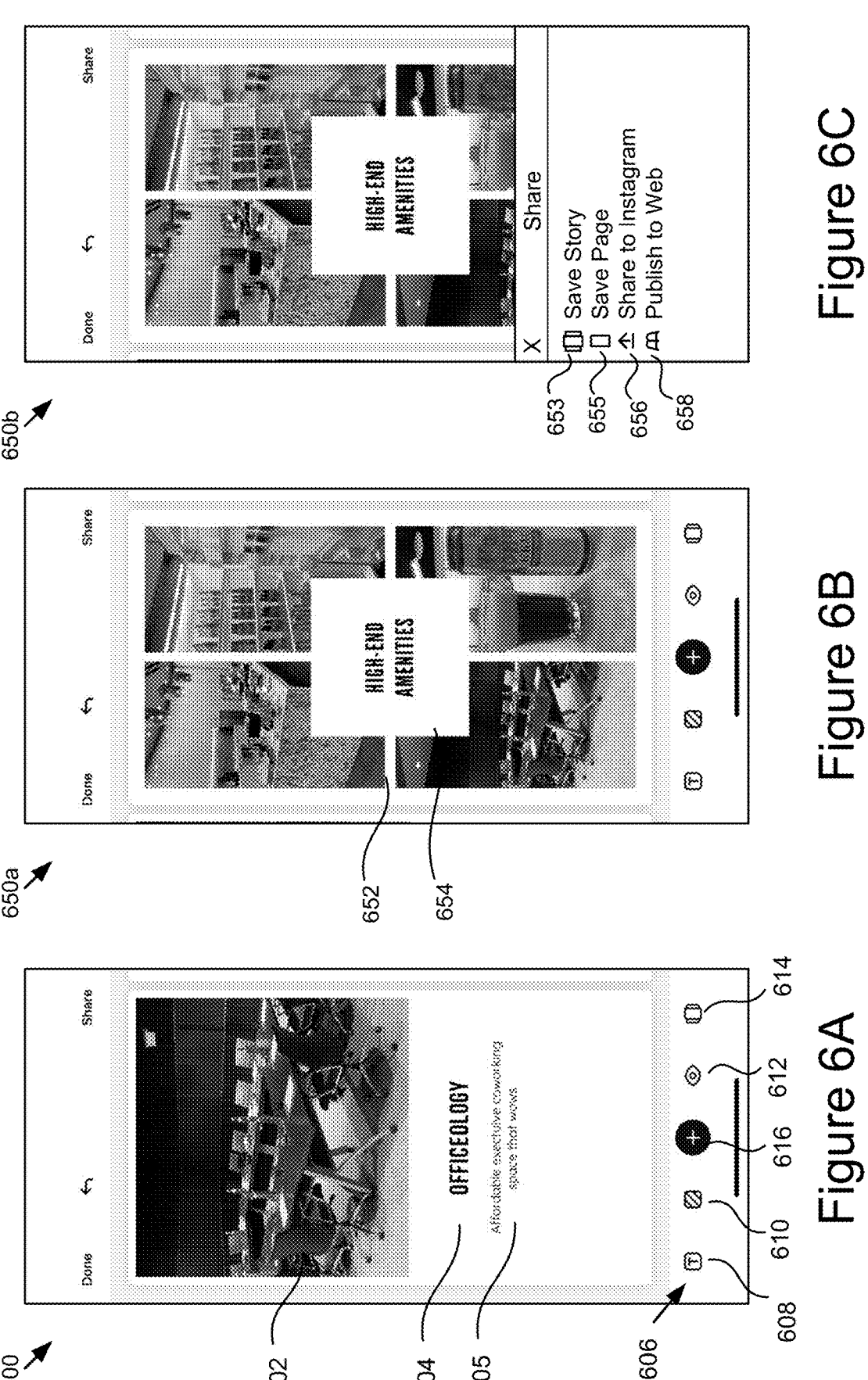
Figure 6E:
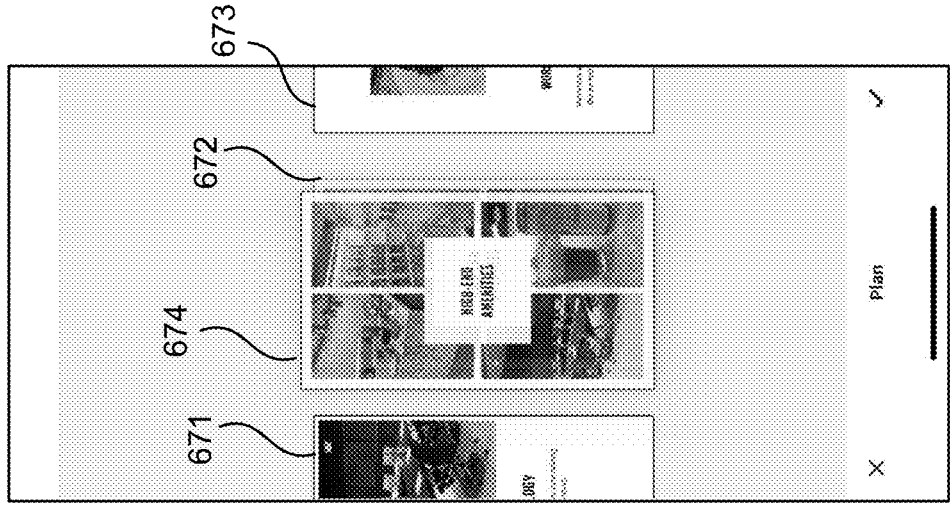
Figure 6D:
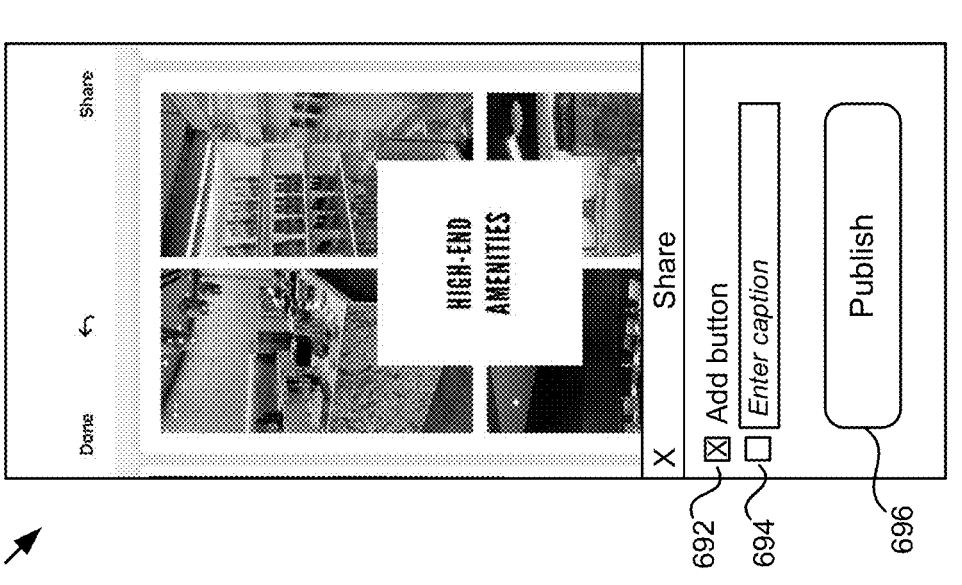
Figures 7, 8:
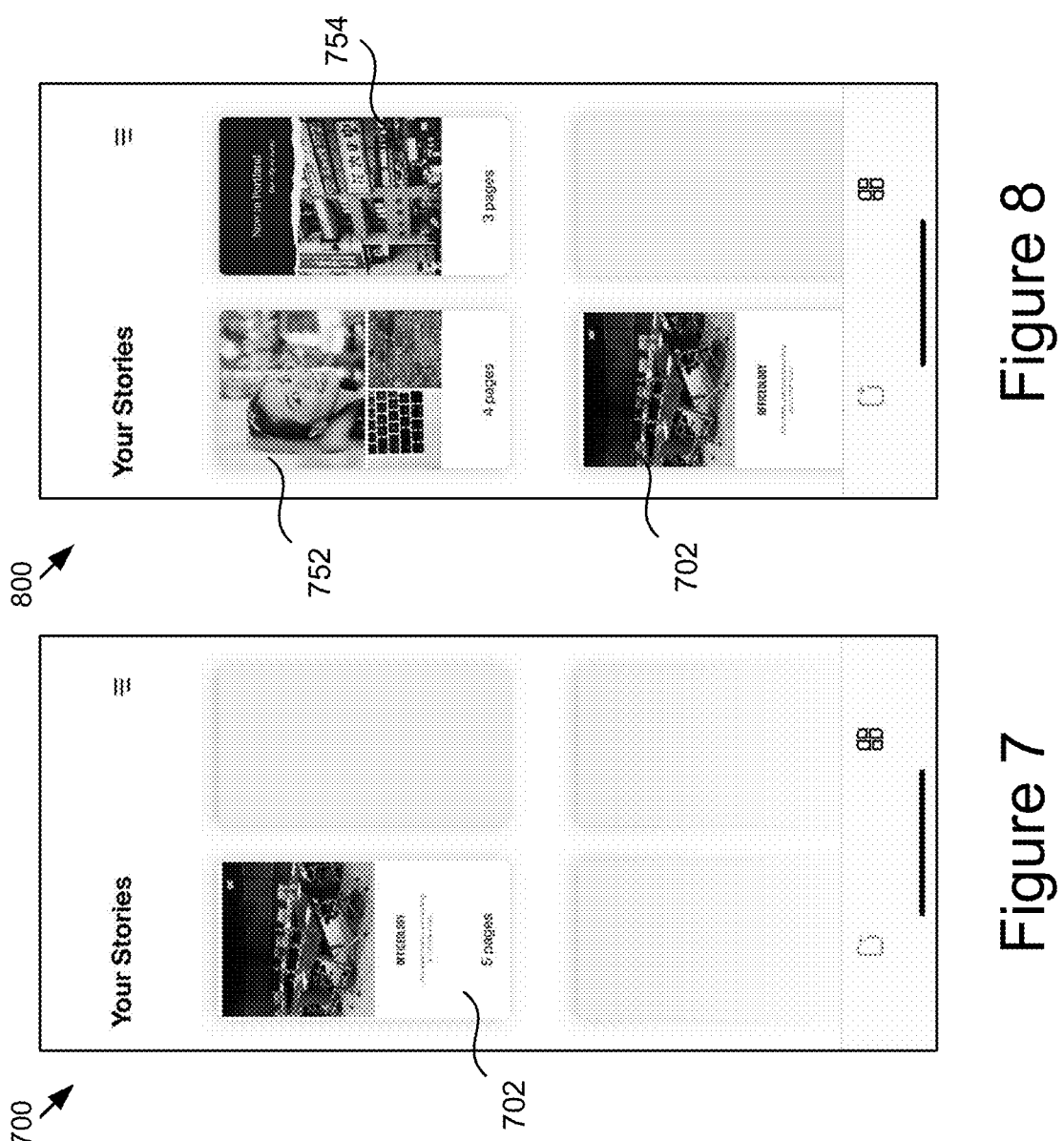

In some cases, the user may start a new story object or edit an existing story object. For example, the mobile application 190 may display stories library user interfaces 300, 700, and 800, as shown in FIGS. 3, 7 and 8, respectively and which may show story objects that have been defined and are stored by a client-side and/or server-side instance of the media publishing application 196, in association with the user in a data repository (e.g., local, cloud-based, etc.). As illustrated in the example of FIG. 3, no story objects have been defined yet. As illustrated in the example of FIG. 7, one story object 702 has been defined. As illustrated in the example of FIG. 8, three story objects 752, 754, and 702 have been defined. A user, using the interface 300, 700, or 800 may select a graphical element to create a new story object, which may cause the media publishing application 196 to display the user interface 400, in which the user may select from various different templates from which to base one or more pages of the story object, such as, but not limited to, a template 402 (which is a template upon which the interfaces and pages in FIGS. 5-6E are based).

The media publishing application 196 may receive various user inputs to customize a page (e.g., add a background photo or video, text, pictures and/or collages, graphical stickers, user-selectable navigation elements, etc.) and/or define other display parameters (e.g., display order, display duration, background music, etc.) for each page of the story object. For example, as depicted in the user interfaces 600, 650*a*, 650*b*, and 650*c* in FIGS. 6A-6D, respectively, the user may include a main image 602 and text regions 604 and 605, which may include a title and description, respectively, in a first, title page and a collage of images 652 with a text overlay 654 in a subsequent page, and so forth.

The user may select a theme of the pages in user interfaces 600 and 650*a* . . . 650*c* by selecting user-selectable element 616, which my open a templates interface 400, as depicted in FIG. 4 and allows the user to navigate various blank, stock, user-defined, etc., templates and select a page style (e.g., blank, minimal, modern, classic, etc.) for a new page to be added.

The user may select a user-selectable interface element (e.g., button) 608, and responsive thereto, the mobile application 190 may display editing elements in interface 600 or 650*a* . . . 650*c* for adding, editing, formatting, and deleting text regions, such as text regions 604, 605, and 654.

The user may select user-selectable interface element (e.g., button) 610, and responsive thereto, the mobile application 190 may display page background editing elements in interfaces 600 or 650*a* . . . 650*c* for editing page elements, such as a background color, pattern, gradient, photo, video, etc. As a further example, as shown in FIG. 5, the user may have defined the page in interface 600 responsive to selecting button 1408, upon which the mobile application 190 may have displayed the interface 500, which includes an image placeholder region 502 for the user to populate with a photo or video, such as the image 602 depicted in FIG. 6, the text editing region 504 and font interface 506 for the user to replace the default text with the text in text region 604 in FIG. 6, and so forth.

The user may select a user-selectable interface element (e.g., button) 612, and responsive thereto, the mobile application 190 may display a preview of the story object and its pages, and allow the user to navigate the story object by (e.g., by swiping right or left, tapping right or left, etc., on a touchscreen or other gesture-based mobile device).

The user may select a user-selectable interface element (e.g., button) 614, and responsive thereto, the mobile application 190 may display a page reordering interface 670 in FIG. 6E, which allows the user to reorder the pages of the story object. For example, a user may provide a first input (e.g., long press) for page 672, and the interface may display a movable representation 674 of page 672, which the user can drag to the left or right to ultimately reposition page 672 before page 671 or after page 673 (or another page of the story object), for example. Additional user-selectable interface elements may provide similar functionality for adding overlay elements, such as graphical annotations (e.g., stickers, shapes, borders, etc.), filters, and/or any other desired enhancements.

In block 104, the mobile application 190 may receive user input(s) defining an action element in association with a graphical page of a story object. For instance, the media publishing application 196 may allow a user to provide a call to action, link, or other user-selectable element that, when selected, presents information or an additional interfaces, such as an action-information region that may be defined by the user input. For example, the user may define a graphical element and location thereof on a graphical page of a story object. The graphical element may be selectable to present one or more additional interfaces, link to other computing systems, and/or perform defined operations. These features may be user defined when a graphical page is added to a story object or after the story object has been published, for example, as a web page. These and other features are described in further detail below in reference to FIGS. 13-16E.

In block 106, once the user is satisfied with the story object that he/she defined, the mobile application 190 may receive a user input requesting the publication of the story object from the user. For instance, as shown in FIG. 6C, a user may select a user-selectable graphical interface element, such as a "Publish to Web" button 658 to publish the story object as a web page. Responsive to selecting button 658, the mobile application 190 may display a share interface (e.g., window, prompt, pop-up, interface, etc.), that includes user-selectable/interactable elements for publishing the story object, such as an option 692 for adding a navigation button to each page of the story object to advance between the pages of the site to be published, an option 694 to add a caption to one or more pages of the site, and button 696, which, upon selection, initiates the transmission of the story object to the server for publication.

Other options for sharing or saving the story object may also be provided, such as buttons "Save Story" 653 to save the story to the user's profile (e.g., for later publishing, editing, etc.), "Save Page" 655, which allows the user to save an image of a page of a story to local storage, such as the a mobile phone's camera roll, and "Share to Instagram" 656, which, upon selection, publishes the story object to Instagram™ Stories (although other platforms are also applicable).

In block 108, the mobile application 190 may initiate publication of the story object. In some implementations, to initiate publication of the story object, the mobile application 190 may export and transmit the story object to the management server 194/media publishing application 196.

In some implementations, the mobile application 190 may generate the story object from an internal editor file format, such as but not limited to a sketch file format. In some implementations, the story object may describe the structure of the web page story and the pages comprising it. For each page, the story object may describe the components included in the page, the layout structure in which the components are organized in the page, and/or other display parameters of the page. The story object may also include the name of the template, the entity identifier (ID) of the entity (e.g., user, business, etc.) that owns the template, and/or other data attributes.

As a further example, the story object may comprise a structured data file in which various data attributes of the file are organized in a predefined format. In some implementations, the file may conform to a structured data file format such as JSON (JavaScript Object Notation), XML (Extensible Markup Language), or other suitable format, etc. In some implementations, to generate the file, the converter 192 may aggregate the parameters of the story object (e.g., for each page, its size, components, component positions, component characteristics (e.g., text format, image size, image format, image name, image URL, etc.)), and organize these parameters and/or other data attributes of the pages based on the predefined format of the file.

In some implementations, in block 120, the media publishing application 196 (e.g., executed on the management server 194) may receive the story object and/or it's component files from the mobile application 190 or mobile computing device.

In block 124, the media publishing application 196 publishes the story object. For instance, the media publishing application 196 may upload the story object to a web server, and publish the story object as a web page to a storage location on the web server associated with a unique uniform resource locator (URL). The web page may comprise one or more web documents. As a non-limiting example, the web document(s) may have one or more formats, for example, selected from HTML, CSS, or JavaScript. The URL and the storage location for the web page may be associated with the user. When publishing the story object, the media publishing application 196 may update a database to store the URL and story object metadata in association with the user.

For instance, the database (e.g., database 1008) may store records for different users, the users may be associated with unique identifiers and the database may store a profile associated with the user and/or an entity associated with the user (e.g., an employer). In association with publishing the story object, the media publishing application 196 may update the profile to include the URL and the storage location. Any other story objects published by the user may also be included in the profile. The profile may indicate how the story objects are interrelated (e.g., interlinked, hierarchical, comprise, and/or are associated with the same web presence, etc.). In a further example, the database may receive and store story object metadata that includes a user identifier of the user, a unique uniform resource locator (URL), and one or more story publication parameters.

In some implementations, upon initiation to publish the story object, the media publishing application may upload the story object to an online storage location, such as the repository or another defined location, such as, but not limited to, an object storage location on a cloud platform, and send, via an API 193 of the media publishing application, a request to the media publishing application 196 requesting to publish the story object as a web page. The request may include a user identifier of the user, a unique uniform resource locator (URL), and/or one or more story publication parameters, as discussed elsewhere herein.

In some implementations, the media publishing application 196 may publish the story object according to the method 200 depicted in FIG. 2. For example, in block 202, the media publishing application 196 may store the assets of the story object in a data repository. The repository may include a location in which file(s) may be stored, such as a directory, file folder, etc. The repository may be included in or include a file system, object storage, or other suitable storage system (a third-party cloud storage location (e.g., Amazon S3™), etc.), such as the database 1008.

In block 204, the media publishing application 196 may generate a URL for the repository. For instance, the repository for the particular story object and/or its assets may have specific, unique file path and the URL may be mapped to that file path. In some implementations, a proxy may be used to map a request for the URL received by a web server to the resources (e.g., web page of the story object) stored in the repository, although other variations are also possible and contemplated herein. In some implementations, assets of the story object may include components of the story object (e.g., images, templates, icons, fonts, content items, media files, Internet links, etc.).

In block 206, the media publishing application 196 may update the database to store the URL, the story object, and/or associated metadata in association with a user and may initiate the publication of the story object, for example, as a web page or microsite in block 208.

In block 210, the converter 192 of the media publishing application 196 may convert the story object in a format suitable for publishing on a social media or other platform, such as Instagram™, into one or more web documents, which comprise a web page.

In block 212, the media publishing application 196 may upload the web documents to a storage location, such as the repository in block 202, a subfolder thereof, another location mapped to or otherwise associated with the repository and/or URL, etc. In some cases, assets for the story object and the web documents may have different URLs, and the web documents may include hyperlinks to the assets. Other variations are also possible and contemplated.

Figure 12:
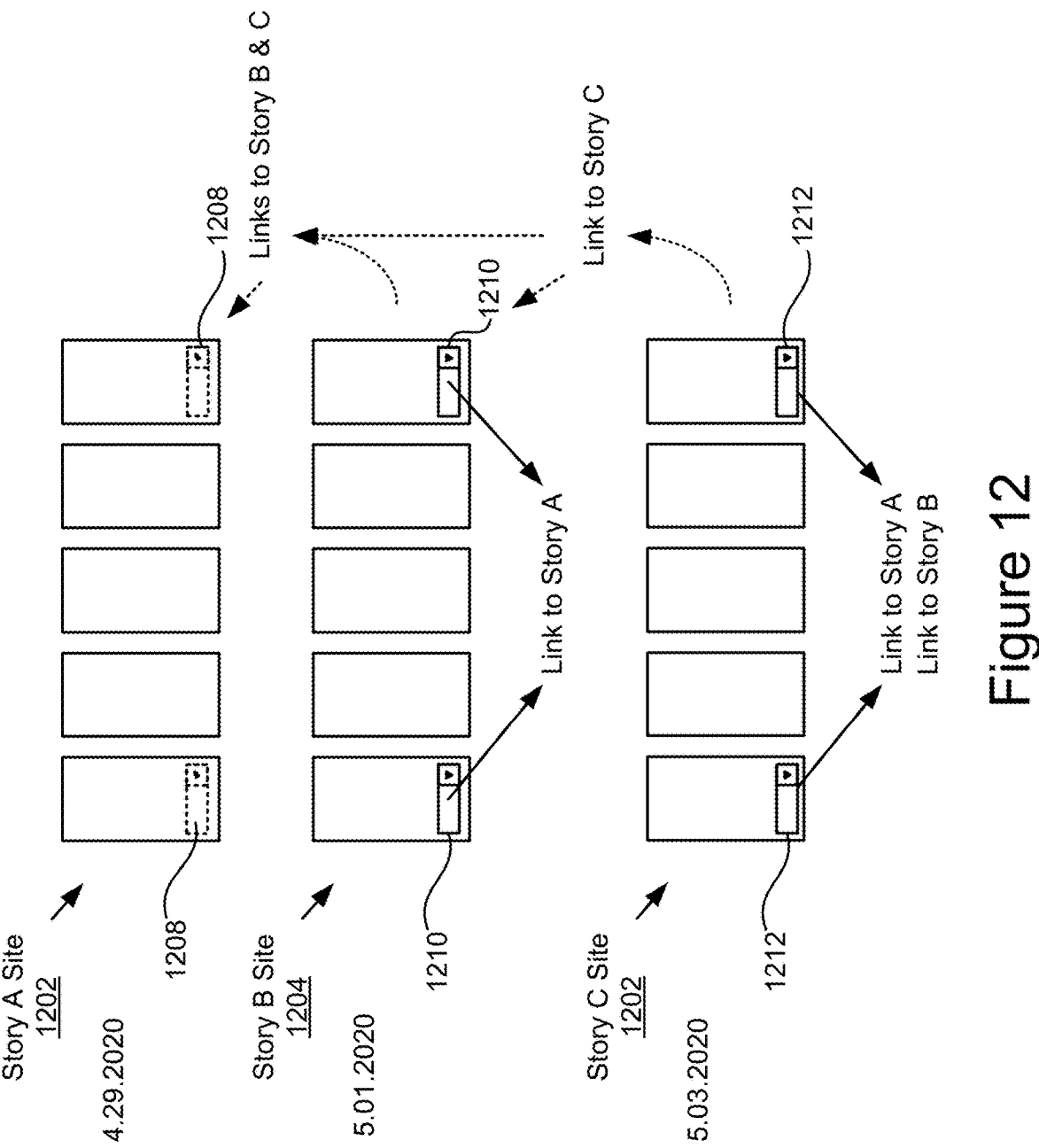
FIG. 12 illustrates a diagram of various story object-based sites or micro sites, which may be displayed at various times.

FIG. 12 depicts a further example where the user has published three story object-based sites (also called micro sites), A, B, and C sequentially at different times (e.g., on Apr. 29, 2020, on May 1, 2020, and on May 3, 2020). In this example, the story A site 1202 is the first site published and does not initially include links to other story sites. However, the story A site may be updated to include links to later stories once those sites have been published. For instance, a user-selectable navigation element 1208 (similar to 1210 or 1212) may be updated to include links to story sites B and C once published. Similarly, as described in further detail in reference to FIG. 13, the story sites may be modified to include action elements for automatically performing defined operations.

As the story B site 1204 is published, the media publishing application 196 may query the database for other sites associated with the user and include links to those sites. In this case, the story A site 1202 may exist so one or more pages of the story B site 1204 may be generated by the media publishing application 196 to include a user-selectable navigation element 1208 (e.g., button(s), drop-down menu, a flat menu, a list of hyperlinks, or other suitable elements) that links to those sites and that the user may select to navigate to those other sites (e.g., via a link to the story A site 1202). For instance, the element 1210 may be updated to include a link story site C once published.

Subsequently, the media publishing application 196 publishes the story C site and, in doing so, queries the database for other sites associated with the user and includes links to those sites. In this case, the story A site 1202 and the story B site may exist so one or more pages of the story B site 1204 may be generated by the media publishing application 196 to include a user-selectable navigation element 1210 (e.g., button(s), drop-down menu, a flat menu, a list of hyperlinks, or other suitable elements) that links to those sites so that the user may select to navigate to those sites (e.g., via links to the story A site 1202 and the story B site 1204).

The inclusion of links between story sites may be user-configurable. In some cases, sites can be grouped by topic by the user (and data reflecting such may be stored in the user's profile), and the media publishing application 196 may query the database to determine which sites to interlink and how. Other variations are also possible and contemplated.

It should be understood that the order of the operations in FIGS. 1 and 2 may vary depending on the implementation without departing from the scope of this disclosure. Further, one or more of the operations may change, be modified, extended, eliminated, etc., without departing from the scope of this disclosure.

Figure 11:
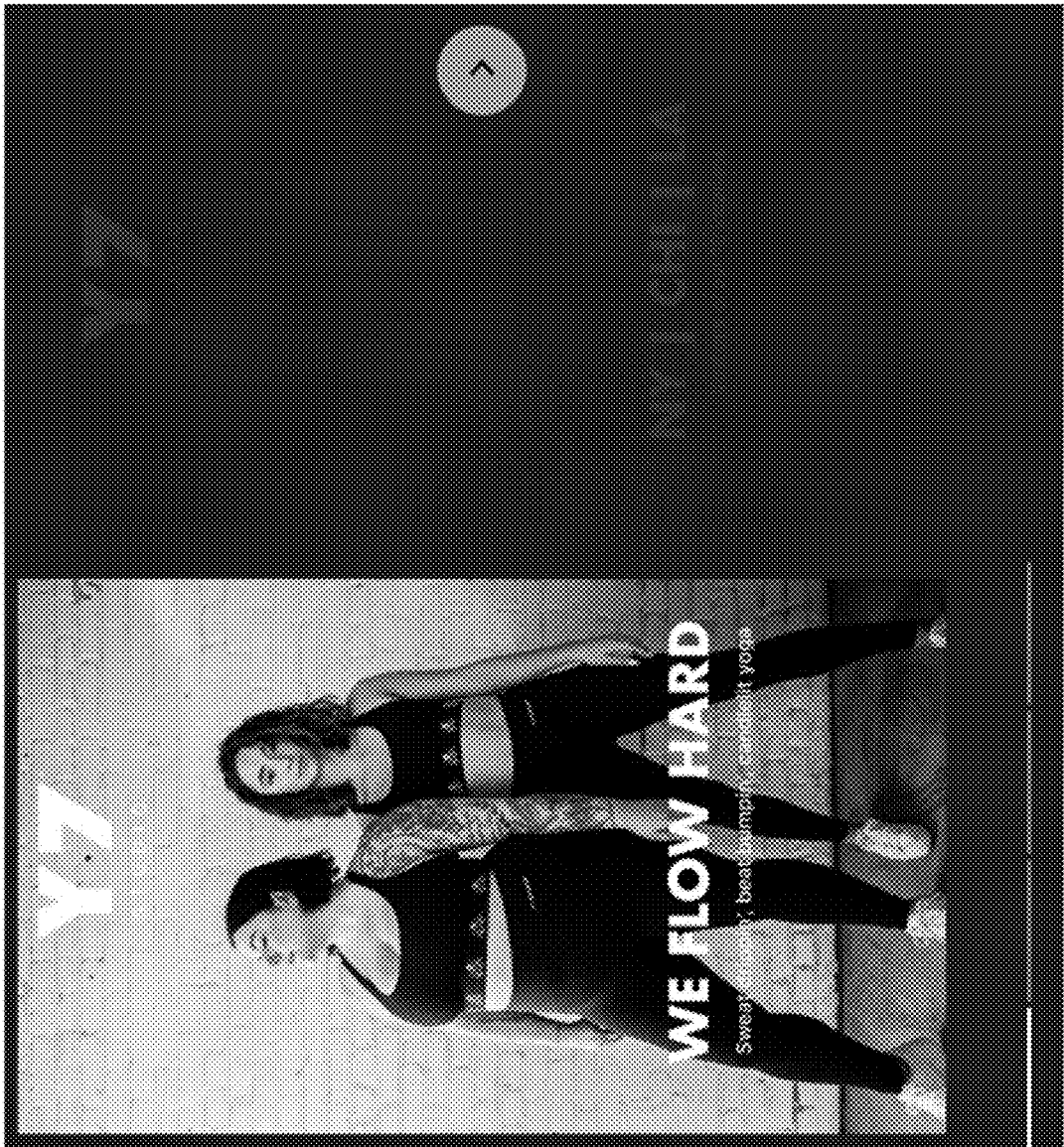
FIG. 11 illustrates an example web site published from a story object designed using a client-side instance of a media publishing application.

FIG. 11 illustrates an example web site 1100 published from a story object designed using a client-side instance of the media publishing application 196.

Returning to FIG. 1, the media publishing application 196 may notify the user that the story object has been published as a web page. For example, the server-side media publishing application 196 may transmit, in block 126, a notification to the client-side media publishing application 196 (e.g., the mobile application 190) indicating that publishing was successfully completed, and a push notification, in-app notification, or other mechanism may notify the user (e.g., via a graphical prompt, user interface, etc.). For instance, in block 108, the mobile application 190 may receive notification of publication and, in block 110, may provide the notification for display on the client computing device on which the mobile application 190 is executed.

Figure 10:
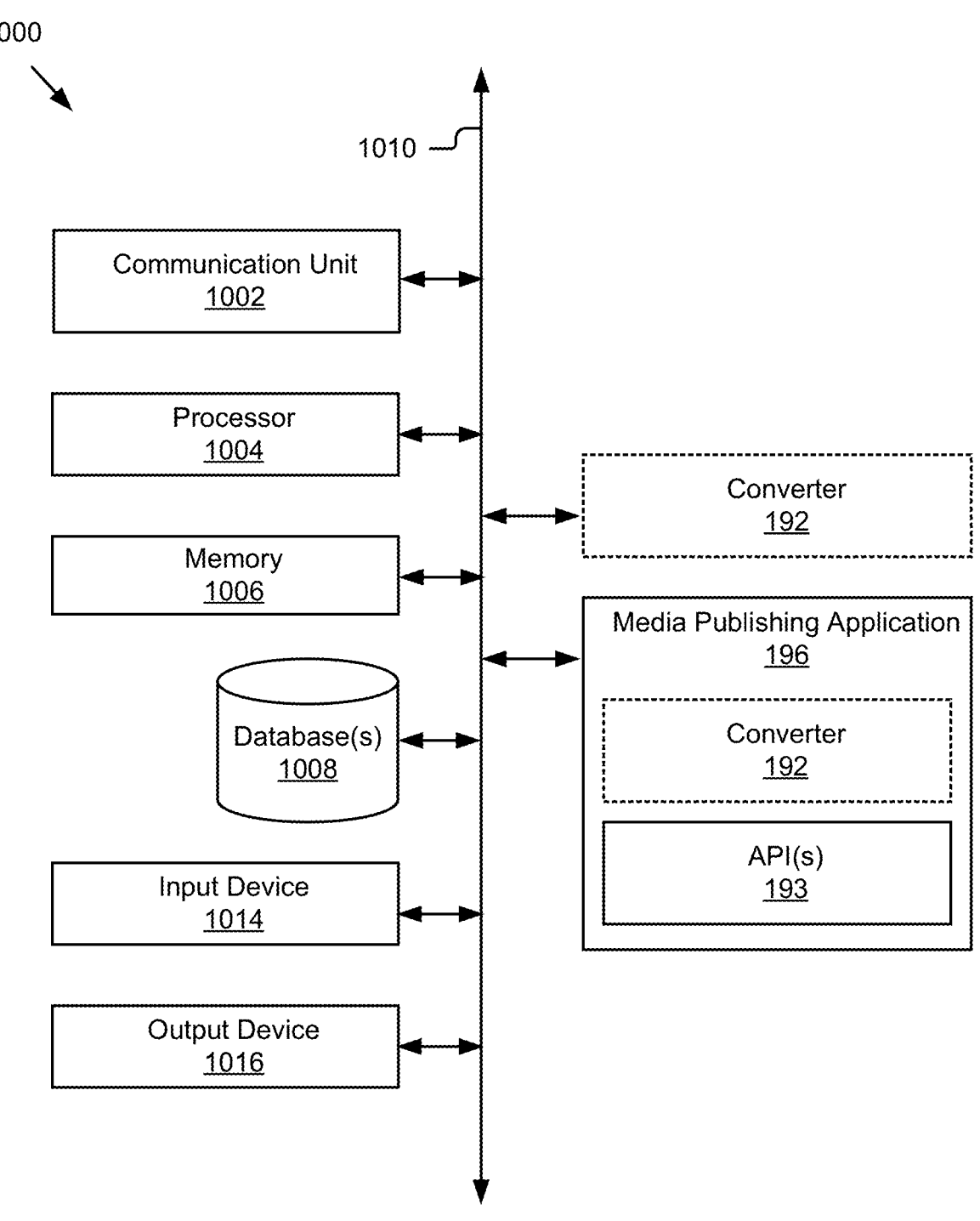
FIG. 10 is a block diagram illustrating an example computing device.

FIG. 10 illustrates a computing device 1000 that can be implemented as the user device 920 or the management server 194. As depicted, the computing device 1000 may include a communication unit 1002, a processor 1004, a memory 1006, database(s) 1008, an input device 1014, an output device 1016, the converter 192, and/or an instance of the media publishing application 196, which may be communicatively coupled by a communication bus 1010. The computing device 1000 depicted in FIG. 10 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 1000 may include various operating systems, sensors, additional processors, and other physical configurations. Although, for purposes of clarity, FIG. 10 only shows a single communication unit 1002, processor

1004, memory 1006, etc., it should be understood that the computing device 1000 may include a plurality of one or more of these components.

The processor 1004 may execute software instructions by performing various input, logical, and/or mathematical operations. The processor 1004 may have various computing architectures to method data signals including, for example, a complex instruction set computer (CISC) architecture, a reduced instruction set computer (RISC) architecture, and/or an architecture implementing a combination of instruction sets. The processor 1004 may be physical and/or virtual, and may include a single core or plurality of processing units and/or cores. In some implementations, the processor 1004 may be capable of generating and providing electronic display signals to a display device, supporting the display of images, capturing and transmitting images, performing complex tasks including various types of feature extraction and sampling, etc. In some implementations, the processor 1004 may be coupled to the memory 1006 via the bus 1010 to access data and instructions therefrom and store data therein. The bus 1010 may couple the processor 1004 to the other components of the computing device 1000 including, for example, the communication unit 1002, the memory 1006, the input device 1014, the output device 1016, and the database(s) 1008.

The memory 1006 may store and provide access to data to the other components of the computing device 1000. The memory 1006 may be included in a single computing device or a plurality of computing devices. In some implementations, the memory 1006 may store instructions and/or data that may be executed by the processor 1004. For example, the memory 1006 may store the mobile application 190, the converter 192, the media publishing application 196, and their respective components, depending on the configuration. The memory 1006 is also capable of storing other instructions and data, including, for example, an operating system, hardware drivers, other software applications, databases, etc. The memory 1006 may be coupled to the bus 1010 for communication with the processor 1004 and the other components of the computing device 1000.

The memory 1006 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 1004. In some implementations, the memory 1006 may include one or more of volatile memory and non-volatile memory (e.g., RAM, ROM, hard disk, optical disk, etc.). It should be understood that the memory 1006 may be a single device or may include multiple types of devices and configurations.

The bus 1010 may include a communication bus for transferring data between components of a computing device or between computing devices, a network bus system including the network 910 or portions thereof, a processor mesh, a combination thereof, etc. In some implementations, the management server 194, the mobile application 190, the converter 192, the media publishing application 196, and various other components operating on the computing device 1000 (operating systems, device drivers, etc.) may cooperate and communicate via a communication mechanism included in or implemented in association with the bus 1010. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1002 may include one or more interface devices (I/F) for wired or wireless connectivity among the components of the system 900. For example, the communication unit 1002 may include various types known connectivity and interface options. The communication unit 1002 may be coupled to the other components of the computing device 1000 via the bus 1010. The communication unit 1002 may be electronically communicatively coupled to the network 910 (e.g., wiredly, wirelessly, etc.). In some implementations, the communication unit 1002 may link the processor 1004 to the network 910, which may in turn be coupled to other processing systems. The communication unit 1002 may provide other connections to the network 910 and to other entities of the computing system 900 using various standard communication protocols.

The input device 1014 may include any device for inputting information into the computing device 1000. In some implementations, the input device 1014 may include one or more peripheral devices. For example, the input device 1014 may include a sensor, a keyboard (e.g., a virtual keyboard), a pointing device (e.g., a virtual mouse device), a microphone for receiving user input via speech, an image/video capture device (e.g., camera), a touch-screen display integrated with the output device 1016, etc.

The output device 1016 may be any device capable of outputting information from the computing device 1000. The output device 1016 may include one or more of a speaker, a display (LCD, OLED, etc.), a haptic device, a touch-screen display, a light indicator, etc. In some implementations, the output device 1016 may be a display that can display electronic content (e.g., images, videos, etc.) with different representation effects (e.g., rewind, overlaid animation, etc.). In some implementations, the computing device 1000 may include a graphics adapter (not shown) for rendering and outputting the electronic content for presentation on the output device 1016. The graphics adapter (not shown) may be a separate processing device including a separate processor and memory (not shown) or may be integrated with the processor 1004 and the memory 1006.

The database(s) 1008 may be data store(s) for storing and providing access to data. The data stored by the database(s) 1008 may be organized and queried using any type of data stored in the database(s) 1008 (e.g., template ID, entity ID, template name, template tag, etc.). The database(s) 1008 may include file systems, databases, data tables, documents, or other organized collections of data. Examples of the types of data stored in the database(s) 1008 may include user data, template data, content item data, etc.

The database(s) 1008 may be included in the computing device 1000 or in another computing system and/or storage system distinct from but coupled to or accessible by the computing device 1000. The database(s) 1008 may include one or more non-transitory computer-readable mediums for storing the data. In some implementations, the database(s) 1008 may be incorporated with the memory 1006 or may be distinct therefrom. In some implementations, the database(s) 1008 may store data associated with a database management system (DBMS) operable on the computing device 1000. For example, the DBMS could include a structured query language (SQL) DBMS, a NoSQL DMBS, a key-value store, various combinations thereof, etc. In some instances, the DBMS may store data in multi-dimensional tables comprised of rows and columns, and manipulate, e.g., insert, query, update and/or delete, rows of data using programmatic operations.

The components 1000, 192, 196, and/or other components (e.g., 1002, 1004, 1006, 1008, 1014, and/or 1016), may be communicatively coupled by the bus 1010 and/or the processor 1004 to one another and/or to other components of the computing system 900. As discussed elsewhere herein, the mobile application 190 (e.g., a client-side instance of the media publishing application 196) may include computer logic (e.g., software logic, hardware logic, etc.) executable by the processor 1004 to provide functionalities for defining and publishing story objects. The converter 192 may include computer logic (e.g., software logic, hardware logic, etc.) executable by the processor 1004 to provide functionalities for generating the web site from a story object. The media publishing application 196 may include computer logic (e.g., software logic, hardware logic, etc.) executable by the processor 1004 to provide functionalities for defining story objects, publishing story objects to various platforms including a web server, converting story objects to web sites, publishing the web sites, and performing other operations described herein. In any of the implementations discussed herein, the mobile application 190, the converter 192, and the media publishing application 196 may be adapted for cooperation and communication with the processor 1004 and/or other components of the computing system 900.

Figure 9:
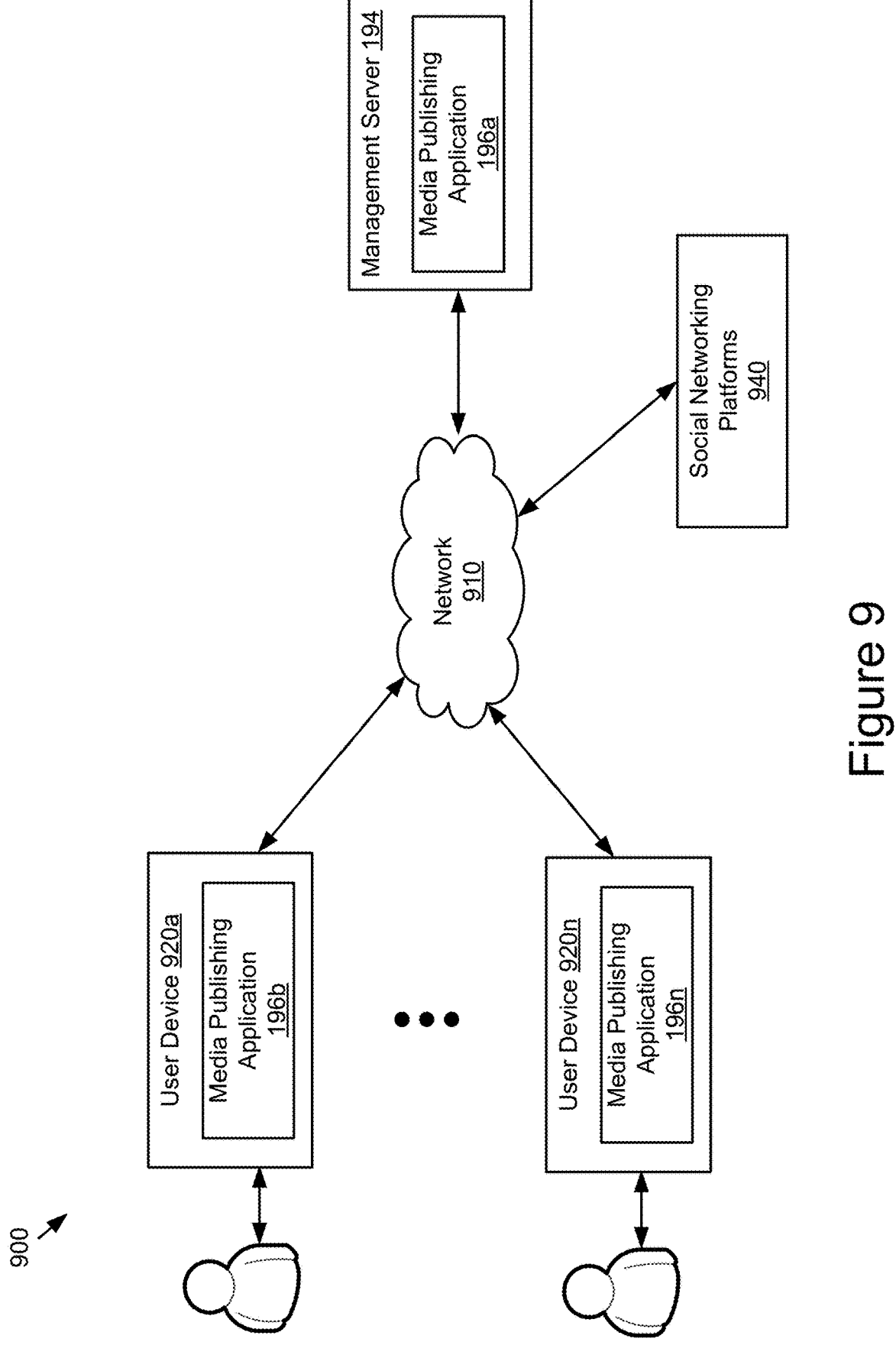
FIG. 9 is a block diagram of an example system and data communication flow for generating templates, providing templates to users, applying templates to content items, publishing story objects, and/or other operations.

As depicted in FIG. 9, the illustrated computing system 900 for generating templates, providing templates to users, and applying templates to content items of the users may include user device(s) 920a . . . 920n (also referred to herein individually and/or collectively as 920), and management server(s) 194, which are electronically and communicatively coupled via the network 910 for interaction with one another, although other system configurations are possible including other devices, systems, and networks. For example, the computing system 900 may include any number of user devices 920, the management servers 194, and other systems and devices, such as social networking platforms 940 (which may be coupled to the network 910 via wired or wireless connection(s)). The user devices 920a . . . 920n, and their components, may be coupled to the network 910. The management server 194 and its components may also be coupled to the network 910.

The network 910 may include any number of networks and/or network types. For example, the network 910 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The management server 194 may have data processing, storing, and communication capabilities, as discussed elsewhere herein. For example, the management server 194 may include one or more hardware servers, server arrays, storage devices and/or systems, etc. In some implementations, the management server 194 may include one or more virtual servers, which operate in a host server environment. As depicted, the management server 194 may include the converter 192, the media publishing application 196, etc., as discussed elsewhere herein. The management server 194 may also host other services such as a third-party application (not shown), which may be individual and/or incorporated into the services provided by the management server 194.

It should be understood that the computing system 900 illustrated in FIG. 9 and the computing device 1000 illustrated in FIG. 10 are representative of example systems and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

FIG. 13 illustrates an example method 1300 for modifying a graphical page of a story object to include an action element and/or action-information region. It should be noted that the operations of the method 1300 and their order may be modified and that other implementations are possible and contemplated herein. For instance, some or all of the operations may be applied during creation of a story object (e.g., when adding or editing pages) or after the story object has been published.

In block 1302, the media publishing application 196 may present one or more application user interface(s) for display to first user(s) on a client computing device, for example via the mobile application 190. For instance, as described in reference to FIGS. 1 and 2, the media publishing application 196 (whether executed on a mobile device, server, other computing device, or distributed among multiple devices) may receive inputs via mobile application user interfaces that define a story object for a social media site. For instance, the story object may include a plurality of, potentially consecutive or ordered, graphical pages.

In block 1304, the media publishing application 196 may receive input from a user defining an action element (multiple action elements may be defined iteratively or simultaneously, depending on the implementation) in association with a graphical page of story object. For instance, the action element may include a graphical sticker, tag, button, or other graphical element associated with a certain graphical page of a plurality of pages in the story object. The action element may be selectable by a user of a published story object to display information, interfaces, and/or perform operations, as described below. For example, the action element may include an HTML button that starts a payment gateway. The operations described herein allow the action element and its background or associated metadata to be easily defined via a mobile application 190, for example, by a user who is unfamiliar with coding software.

In some implementations, the input received from the administrative user defining the action element may include information identifying a product, which may be depicted in a content item (e.g., an image, video, etc.) displayed on the certain graphical page. For instance, the information may define the name, purchase price, or other information associated with a product (e.g., the illustrated skirt) in an image on the graphical page (e.g., as illustrated in FIGS. 14A-15J). The input may define other attributes of the product or content element, such as its appearance, for example, whether the action element includes a sticker, button, tag, image, iframe, etc., or its color, size, orientation, and so forth.

In some implementations, the input may additionally or alternatively define a location on the graphical page, content item, etc., for the action element. For instance, the location may be a graphical location defined in reference to the graphical page, content item, cartesian coordinates, vector coordinates, etc. For example, the graphical location of the action element may be a specific location on an image such that if the image is cropped, skewed, moved, etc., on the graphical page of the content story (e.g., due to the graphical page being displayed on client devices with various screen sizes or aspect ratios), the action element may be consistently displayed at the correct location relative to the depiction of the product in the image. It should also be noted that the content item may additionally or alternatively include a video (or other media) and the defined location of the action element may also include a time component, so it is located at both the correct location(s) and time(s) of the video when displayed.

The action element may be activated to perform an operation, such as displaying various interfaces. For instance, the input may also define one or more interfaces that may be displayed and/or operations performed in response to selecting the action element, for example, the media publishing application 196 may display an action-information region based on an interaction (click, hover, etc.) with an action element. An action-information region may include a fillable form, direct purchase interface, affiliate link, payment gateway, or interfaces providing additional information about the product or associated products. The action-information region is described in further detail below in reference to block 1310.

For example, as illustrated in FIG. 14A-14F, the media publishing application 196 may receive inputs from a user to define an action element and/or action-information region.

Figures 14A, 14B, 14C:
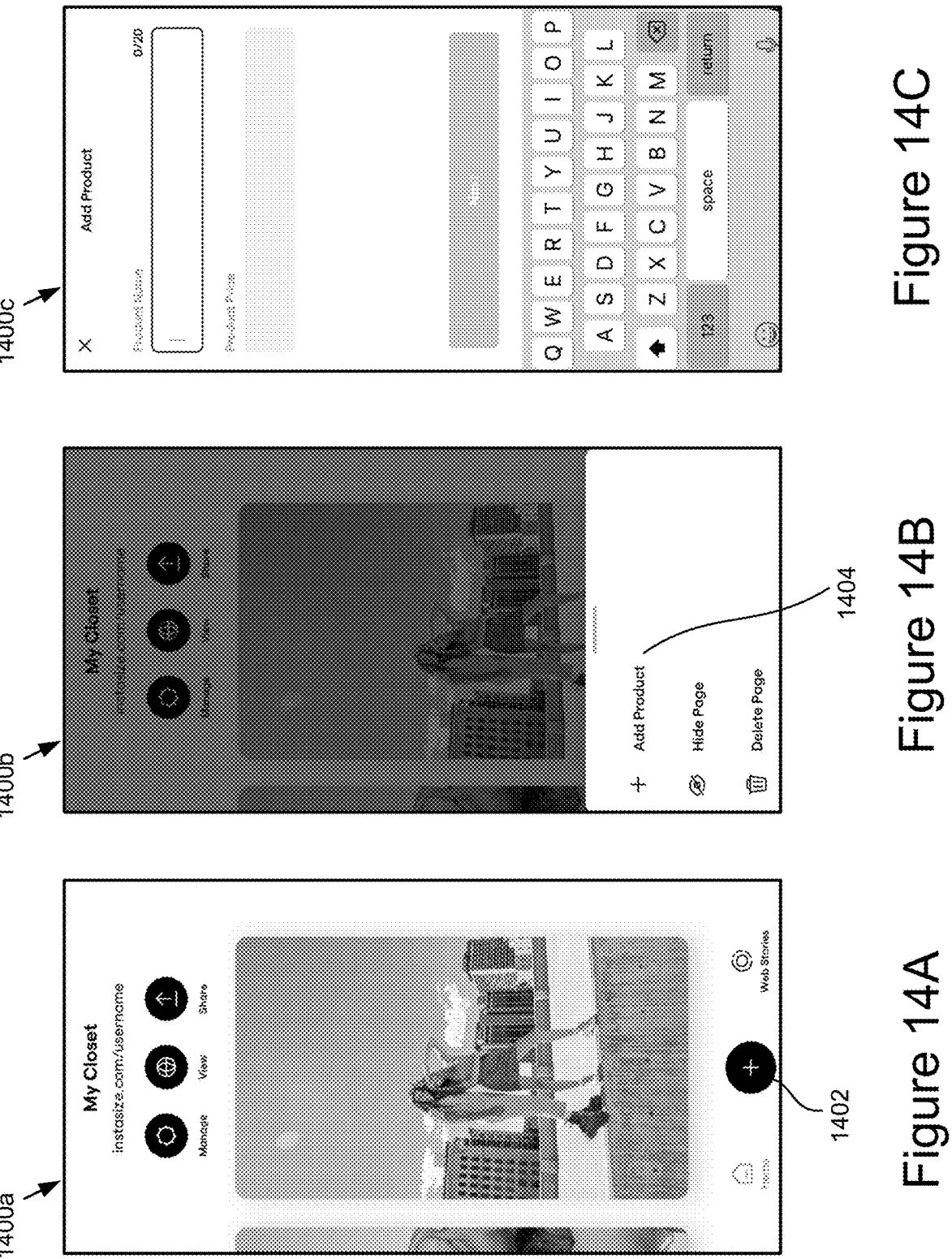
FIGS. 14A-14G illustrate example graphical user interfaces for setting up action elements in association with a certain graphical page of a story object.

FIG. 14A illustrates an interface 1400*a* displaying a graphical page with a selectable element 1402 that may be selected to add additional features to a certain graphical page. For instance, in response to selecting the element 1402, the media publishing application 196 may display the interface 1402*b* including an option 1404 to add an action element to the graphical page, as illustrated in the interface 1400*b* of FIG. 14B. In some implementations, the option 1404 may be overlaid over the graphical page, for example, in a popup interface.

Upon receiving input selecting the option 1404, the media publishing application 196 may include various interactable elements, such as text fields, selectable elements, drop downs, image uploads, etc., as shown in the interface 1400*c* in FIG. 14C. For example, as illustrated in the interface 1400*d* in FIG. 14D, the media publishing application 196 may receive product information, price, or other information via the interactable elements. It should be noted that the media publishing application 196 may receive other information for defining an affiliate link, information or pay gateway, information-gathering form, etc., as described in further detail elsewhere herein.

Figures 14D, 14E, 14F:
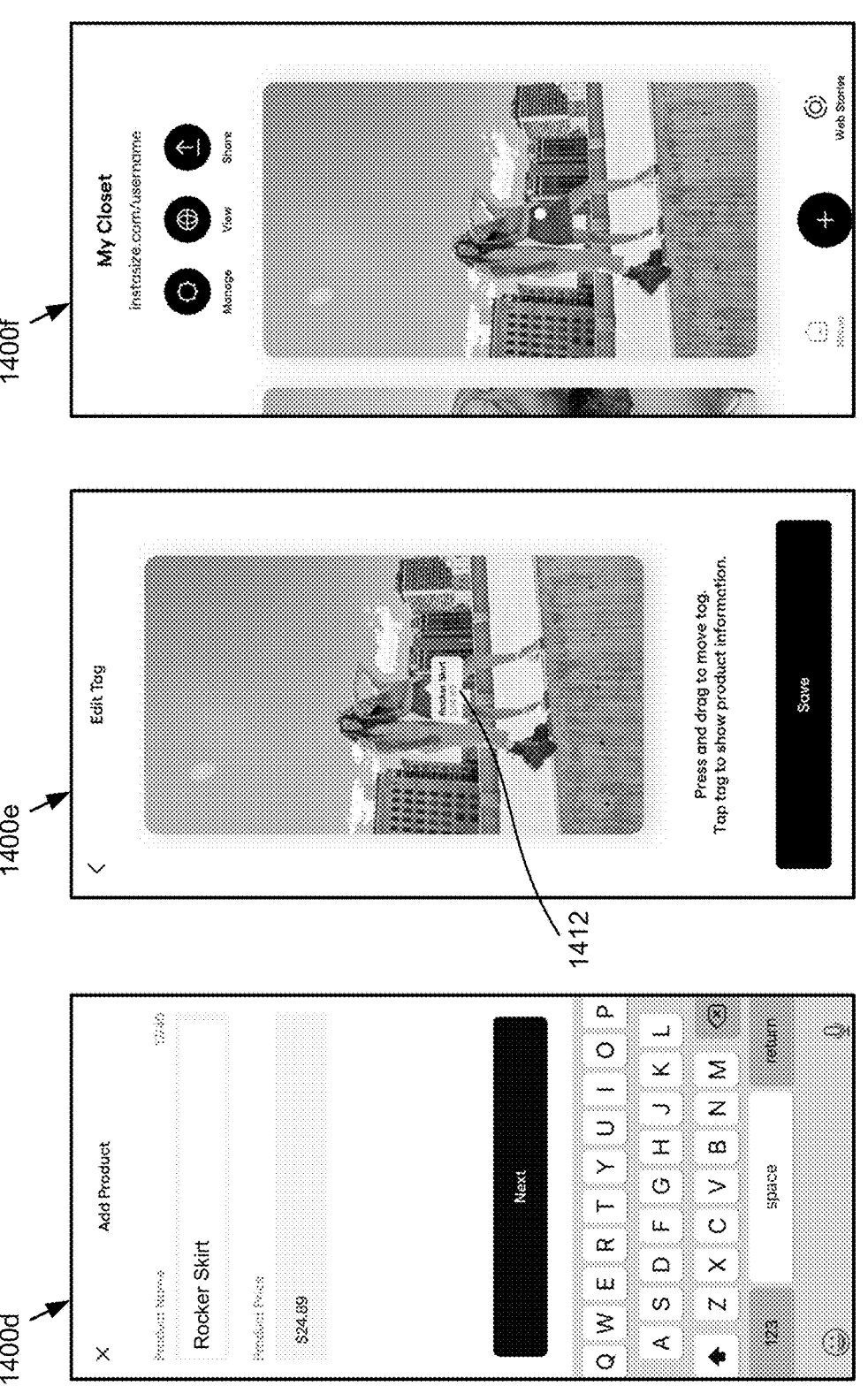

As illustrated in FIG. 14E, the media publishing application 196 may display an action element 1412, which the user can drag to associate the action element (e.g., represented by a tag) with a certain graphical location within the graphical page. As illustrated in FIG. 14F, once the location and other attributes of the action element are stored (e.g., in a database 1008), the media publishing application 196 may display an interface 1400/ indicating the defined location of the action element and providing other options for further creating the story object, adding additional action elements, or performing other operations.

In some implementations, the action element may be defined during creation of the story object, although, it should be noted that it may be performed on a published story object or microsite whether by the original creator or by another user (e.g., based on a role, delegated authority, etc.). For instance, the media publishing application 196 may authenticate a certain user and, accordingly, allow the user to add action elements or other features to a published story object.

In block 1306, the media publishing application 196 may associate the action element with a graphical location on the certain graphical page of the story object. For instance, as described above, the media publishing application 196 may store the graphical location and/or time of an action element in metadata or another file associated with a graphical page, content item, and/or story object.

In block 1308, the media publishing application 196 may determine whether (e.g., based on user input, satisfaction of defined criteria, etc.) to create an alternate version of the graphical page, for example, for testing effectiveness of a graphical page, for example, based on click rate of an action element, purchase rate of an associated product, dwell time on a graphical page, or other interactions with the graphical page. For instance, the media publishing application 196 may repeat some or all of the operations of the method 1300 to generate the alternative page.

In some implementations, a user may create two versions of a graphical page as an "A" version and a "B" version, although other quantities are possible and contemplated herein. The user and/or media publishing application 196 may associate the same or different content items, action elements, and/or action-information regions with each version of a graphical page. For example, the media publishing application 196 may, based on user input, define an action element and associate it with two different graphical pages. For instance, each version of the graphical page may have different composition (e.g., color, arrangement, filter, border, template, etc.) and/or content items (e.g., image, video, etc.). For example, the action element may be associated with a first location on version A of a graphical page containing an image, and the action element may be associated with a second location on version B of a graphical page containing a video.

Depending on the implementation, the version of the graphical page served to a viewer of the published story object may be determined randomly, based on defined percentage of each version to display, based on a similarity of the viewing user to other users for whom the version was most effective (e.g., based on click through, dwell time, manual feedback, etc.), or based on other criteria. In some implementations, the version served to a certain user may be based on authentication of a user. For instance, a user may be authenticated to view version B, but not version A. In some instances, a user may not be authenticated to view the graphical page at all, in which circumstance, the media publishing application 196 may omit the graphical page from the displayed story object altogether.

Figure 14G:
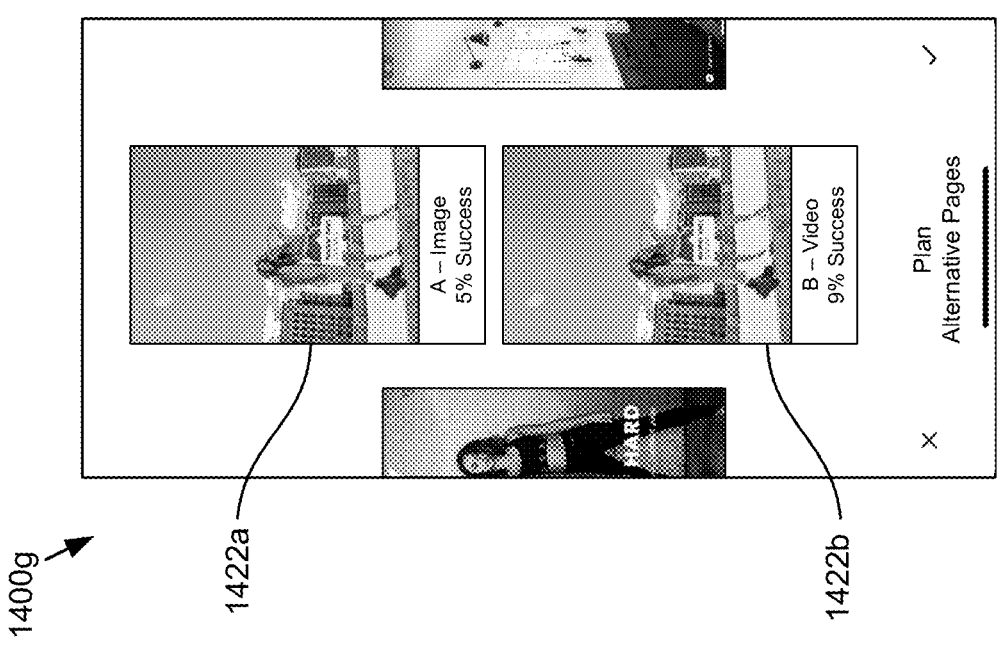

FIG. 14G illustrates an example interface 1400g displaying version A and version B of a graphical page in a story object. For instance, the media publishing application 196 may display a graphical depiction 1422a and 1422b for each version during creation or editing of the story object.

In some implementations, the media publishing application 196 may gather analytics related to each version, for example, representing the effectiveness or success over a defined metric (e.g., as described above) of the versions. For instance, as illustrated, the graphical depiction may display real-time analytics data, among other potential data. Depending on the implementation, the user may select which version to present and/or the criteria upon which a version is presented. The user may start, pause, or end presentation of a particular version or perform other modifications.

In block 1310, the media publishing application 196 may generate one or more action-information region(s) for the action element(s) based on the user inputs. It should be noted that although the action-information region(s) may be generated during user input defining the action element and/or action-information region, as described above, it may be generated when a story object is displayed, or it may be performed as a background operation based on the user input.

Figures 15A, 15B, 15C:

As illustrated in FIGS. 15A-15J, the media publishing application 196 may display action-information region(s) to a user viewing the story object, for example, in response to selection of an action element. For example, FIG. 15A illustrates an example interface 1500a in which a graphical action element 1502, such as a button, is displayed.

The media publishing application 196 may receive a selection of the action element 1502 and, accordingly, display an action-information region 1504 that provides additional information and/or actions that may be performed relative to the action element. For instance, as illustrated in the example interface 1500b in FIG. 15B, the action-information region 1504 may display a name and price of a product and may be selectable to provide additional information or operations.

In some implementations, there may be more than one action-information region or associated interface. For instance, FIG. 15C illustrates an example interface 1500c in which a purchase gateway 1516 may be displayed on a client device. The purchase gateway 1516 may allow interaction with a payment service via the management server 194.

Figures 15D, 15E, 15F:
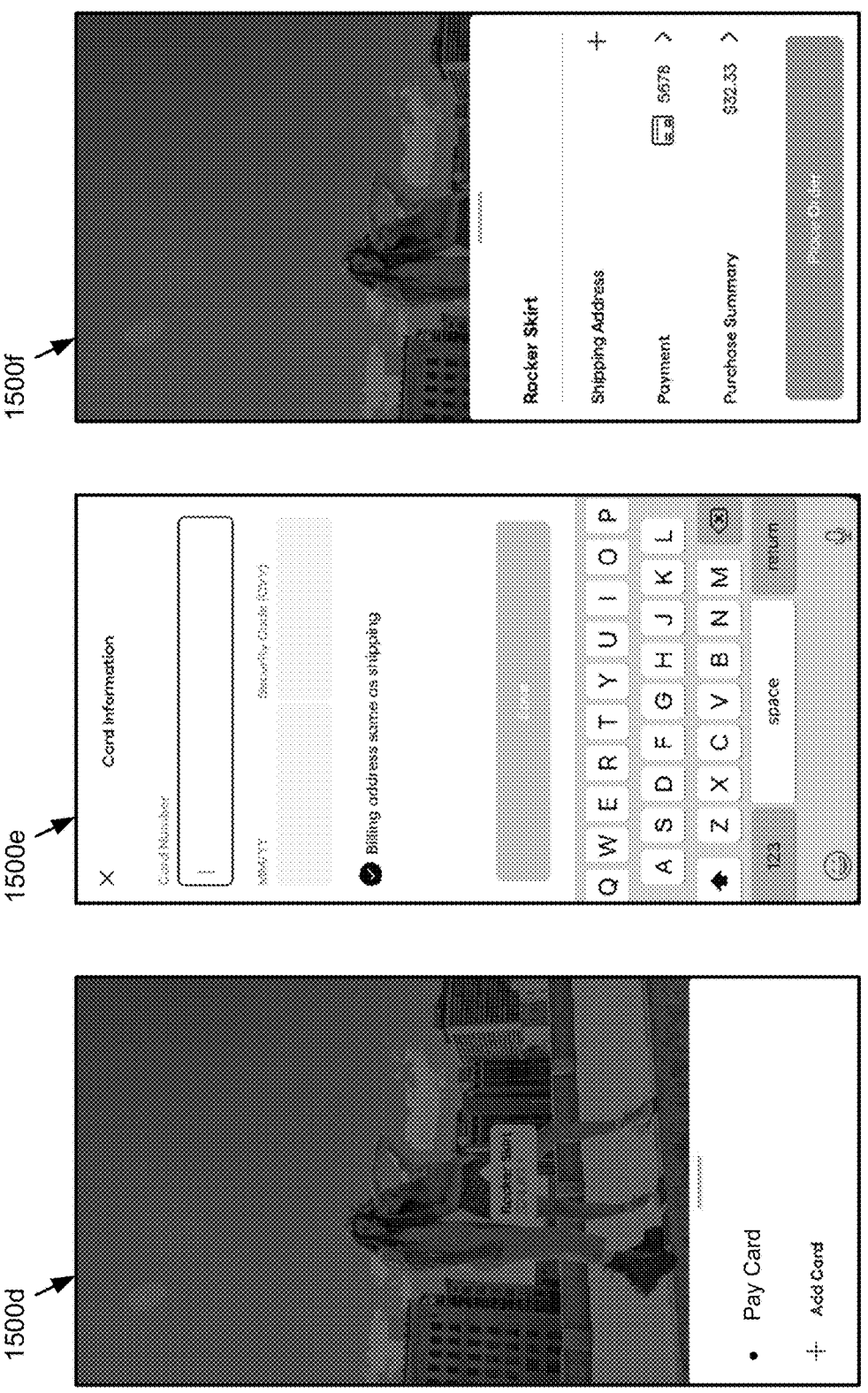

As illustrated in the example interfaces 1500d, 1500e, and 1500f in FIGS. 15D, 15E, and 15F, respectively, the media publication application 196 may receive payment information from the user for a product associated with the action element, for example, represented at the graphical location of the action element.

Figures 15H, 15I, 15J:
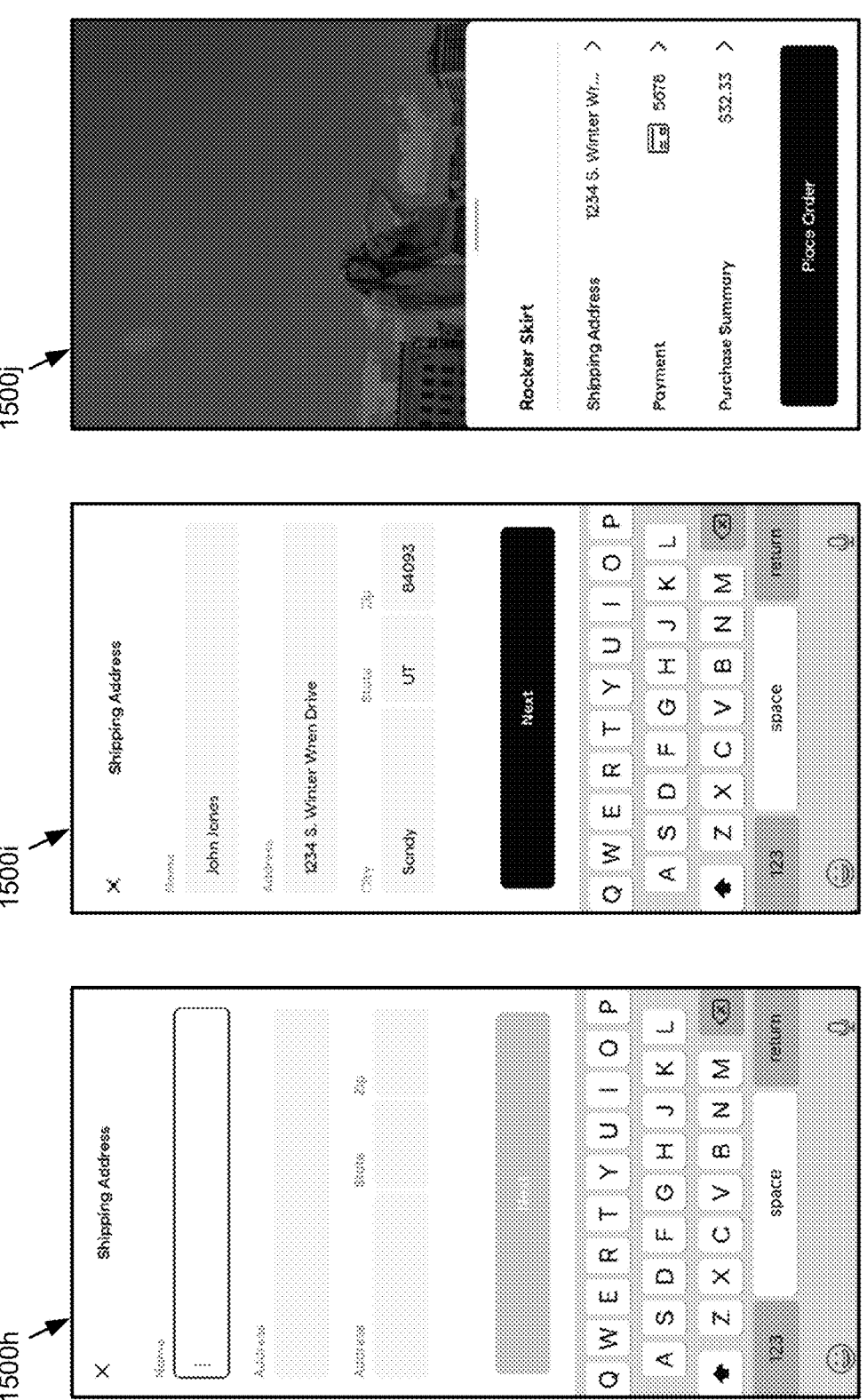

As illustrated in the example interfaces 1500h, 1500i, and 1500j in FIGS. 15H, 15I, and 15J, respectively, the media publication application 196 may gather other information from a user, such as a shipping address, name, or other information. The media publication application 196 may automatically communicate with a payment and/or fulfillment system to fulfill an order of the product. In some instances, an administrative user or company may have a pre-existing agreement with the management server 194, which allows the management server 194 to automatically handle payment, information gathering, etc., on the user's behalf, so that the user does not have to setup payment, etc., for a published story object or microsite.

Similarly, the action-information region may include a gateway to another web page associated with the action element. In some implementations, the gateway may include an affiliate link to a third-party website that may provide additional information or operations associated with a product depicted on the graphical page. The media publishing application 196 may receive a description, link, or other defining information from the administrative user (e.g., the user creating the story object, as described above) and may automatically interact with a third-party server, etc. (e.g., via APIs, macros, etc.), to automatically generate an affiliate link and provide it in the action-information region. For example, a user may provide a link to a retailer's web page when defining the action element and, using the link, the media publishing application 196 identify the specific product and associated attributes and interact with a server of the retailer to set up an affiliate link. The media publishing application 196 may then automatically generate an action-information region that includes the affiliate link or redirects the user to the retailer's web site for the product via the affiliate link.

In some implementations, the action-information region may vary based on a version (e.g., A or B) of the graphical page presented. Similarly, the action-information region may include multiple interfaces or regions, a fillable form for collecting information (e.g., a name, e-mail address, etc.) from the user or displaying additional information corresponding to a product located at the graphical location of the action element.

In some implementations, the action-information region may include additional interfaces that may be displayed separate from the graphical page or overlaid over it. For example, FIGS. 16A-16E illustrate action elements, action-information regions, and additional connected interfaces that may be provided by the management server 194, a social network platform 940, or third-party server.

Figures 16A, 16B, 16C:
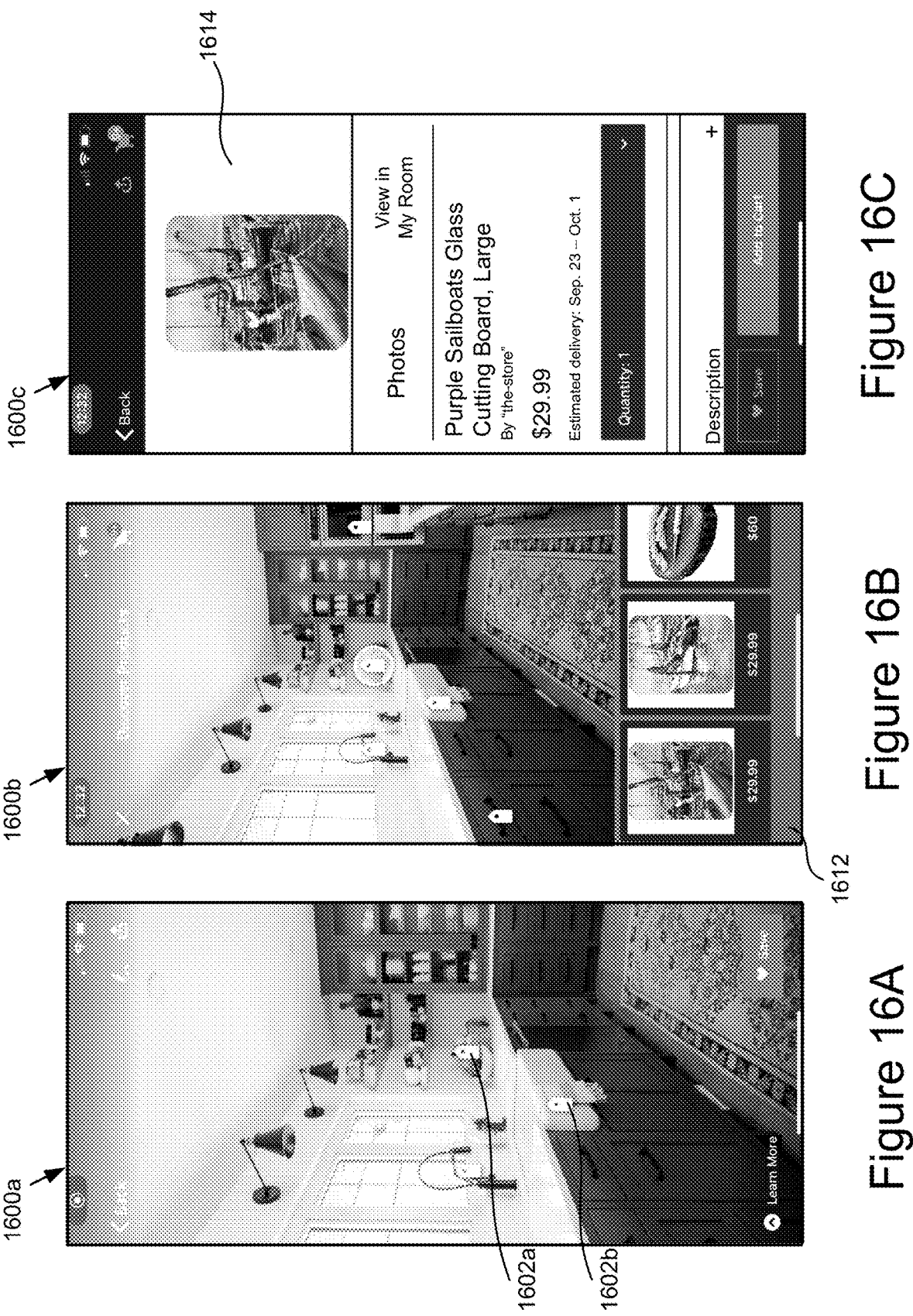
FIGS. 16A-16E illustrate example graphical user interfaces for displaying an action element and associated action-information graphical region on a client computing device.

FIG. 16A illustrates an example interface 1600a with a graphical page. As illustrated, the interface 1600a also includes action elements 1602a and 1602b represented as tags. In some implementations, the media publishing application 196 may receive a selection of an action element (e.g., 1602a) and, in response, surface a first action-information region 1612, as illustrated in the example interface 1600b in FIG. 16B. The first action-information region 1612 may include graphical depictions or enlargements of the item(s) represented at the graphical location. The example interface 1600c in FIG. 16C includes a second action-information region 1614 and/or further detail respective to the first action-information region 1612. For example, a user may select a graphical depiction and/or drag the first action-information region 1612 up to surface the second action-information region 1614.

Figures 16D, 16E:
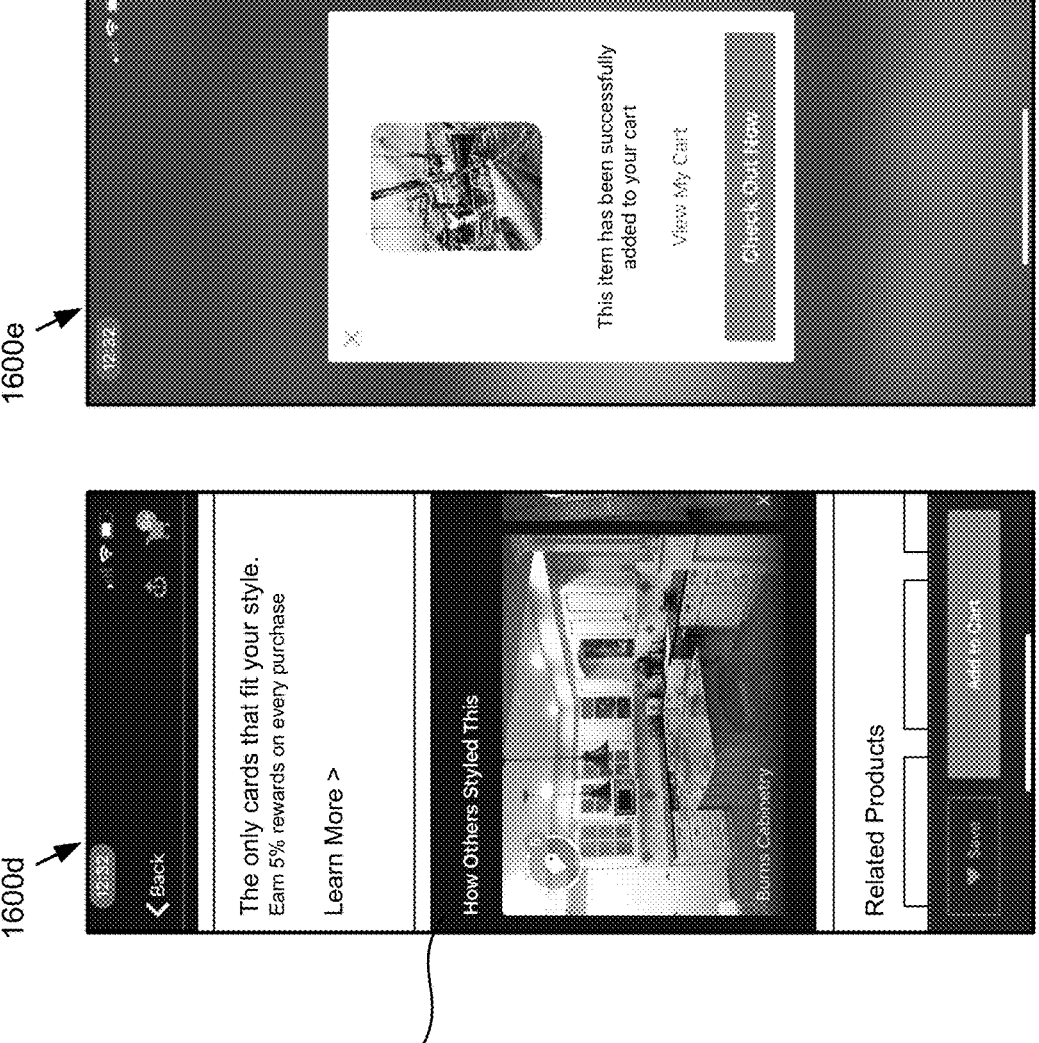

In some implementations, as illustrated in the example interfaces of 1600c, 1600d, and 1600e in FIGS. 16C, 16D, and 16E, respectively, the media publishing application 196 may display additional options (e.g., quantity, color, style, etc.), information, and/or commerce interfaces of an item associated with the action element. The interfaces may provide social-media information 1622, the ability to create and/or add items to a cart, or other information that may be aggregated from various sources, such as a social-media platform 940, local database, or third-party server. For example, these interfaces may be provided by a third-party server, social network platform 940, management server, or enterprise server to provide automated information and operations without a user having to manually configure the additional interfaces, interactions, operations, or functionality.

In block 1312, the media publishing application 196 may publish the story object as a web page, for example, to a storage location on a web server associated with URL. For example, the media publishing application 196 may upload the story object to an online storage location, for example, by sending, via an API, a user identifier of the creating user, a URL, publication parameters, etc., in a request to publish the story object as a web page, as described in further detail in reference to FIGS. 1 and 2 above.

In block 1314, the media publishing application 196 may present a story object, graphical page, and/or action element (e.g., at the defined graphical location) to one or more second user(s), as described above in reference to FIGS. 15A, 15B, 16A, and 16B. For example, the media publishing application 196 or another system or server serving a web page, micro site, etc., may serve the graphical page of the published story object to a client computing device of a user viewing the published object.

In some implementations, access to a particular graphical page of a story object may be based on attributes of a user, for example, based on authentication of the user/client computing device of the user. For instance, whether the user has access to the particular graphical page, version of the graphical page, story object, action element, action-information region, and/or other functionality may be based on the authenticated access. For example, where an administrative user has enabled multiple versions of a graphical page, the version of the graphical page served to a second user may be based on whether the second user is authenticated for that version.

In block 1316, the media publishing application 196 may display an action-information region a client computing device, for example, based on an interaction with the action element by the second user (e.g., as illustrated in FIGS. 15B-15J and 16B-16E). In some implementations, the media publishing application 196 may track additional interactions, such as click streams, dwell/viewing time, purchases, etc., of the second user with the action-information region.

In some implementations, interactions with the action-information region may cause the media publishing application 196, management server 194, or other device to automatically perform an operation based on the interactions. For instance, the action-information region may redirect a client computing device to a separate web page, send a product (e.g., via download, fulfillment/shipping, etc.) to the second user, or collect information, although other operations are possible.

In block 1318, the media publishing application 196 may analyze the interaction(s) of one or more users with the graphical page, versions of the graphical page, action element, action-information region, etc. For instance, the media publishing application 196 may track interactions with each version of the graphical page and compare them to create analytics statistically, using machine learning, etc.

In some implementations, the media publishing application 196 may track the effectiveness, as described above, of an action element in association with a particular version of the graphical page and its used computation resources. For example, the analytics may describe the effectiveness of an action element displayed in a photo against a video, as illustrated and described in reference to FIG. 14G. For instance, if a first graphical page uses less than or equal bandwidth to an equally effective second version of the graphical page, the media publishing application 196 may automatically serve the lower bandwidth version. Accordingly, the media publishing application 196 may automatically optimize the computational efficiency of a story object (e.g., one or multiple graphical pages of the story object).

In some implementations, the media publishing application 196 may present, via mobile application user interfaces, the first graphical page and the second graphical page as alternatives for the story object. Additionally or alternatively, the media publishing application 196 may present a graphical representation of the analysis. These examples are described and illustrated in reference to FIG. 14G. For instance, the user interface of the media publishing application 196 may display, to an administrative user or curator of the story object, both versions of the graphical page, conversion statistics, etc., which may be updated in real time and allow the user to dynamically adjust the story object.

The features and advantages described herein are not all-inclusive and many additional features and advantages will be apparent to a person of ordinary skill in the art in view of the figures and description. Also, it should be noted that the language used in the specification has been selected for readability and instructional purposes and not to limit the scope of the inventive subject matter.

While various methods are described herein, it should be understood that the methods are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
presenting one or more mobile application user interfaces to a user on a client computing device;
generating, responsive to a first input received from the user via the one or more mobile application user interfaces, a story object for a social media site, the story object comprising a plurality of graphical pages, the plurality of graphical pages having a defined sequential order;
generating, responsive to a second input received from the user via the one or more mobile application user interfaces, an action element in association with a certain graphical page and an alternative certain graphical page of the story object, the plurality of graphical pages including:

a certain version of a certain set of graphical pages, and the certain graphical page or the alternative certain graphical page displayable at a defined point in the sequential order among the certain set of graphical pages of the certain version, the alternative certain graphical page being displayed instead of the certain graphical page at the defined point in the sequential order based on a determined criterion;

associating the action element with one or more graphical locations on the certain graphical page and the alternative certain graphical page of the story object;

generating a first action-information region and a second action-information region at the one or more graphical locations based on the second input, the first action-information region being displayable based on a first interaction with the action element and the second action-information region displayable based on a second interaction with the first action-information region, the second action-information region including a quantity selection element allowing a quantity of an item associated with the action element to be selected and an add-to-cart element causing the selected quantity to be added to a virtual cart;

uploading the story object to an online storage location;

publishing, via an API of a media publishing application, the story object as a web page, wherein the published story object includes a user identifier of the user, a unique uniform resource locator (URL), and one or more story publication parameters, and further wherein the published story object includes the certain set of graphical pages of the certain version and the action element at the one or more graphical locations of the certain graphical page or the alternative certain graphical page;

receiving notification that the web page was published at the URL;

receiving analytics related to the certain graphical page and the alternative certain graphical page; and displaying analytics data based on the received analytics related to the certain graphical page and the alternative certain graphical page.

2. A method comprising:

presenting one or more application user interfaces for display to a first user on a first client computing device;

generating, responsive to a first input received from the first user via the one or more application user interfaces, an action element in association with a first graphical page and an alternative first graphical page of a story object, the story object including a plurality of graphical pages having a defined sequential order, the plurality of graphical pages including:

a first version of a first set of graphical pages, and the first graphical page or the alternative first graphical page displayable at a defined point in the sequential order among the first set of graphical pages of the first version, the alternative first graphical page being displayed instead of the first graphical page at the defined point in the sequential order based on a determined criterion;

associating the action element with one or more graphical locations on the first graphical page and the alternative first graphical page of the story object;

generating a first action-information region and a second action-information region at the one or more graphical locations based on the first input, the first action-information region being displayable based on a first interaction with the action element and the second action-information region being displayable based on a second interaction with the first action-information region; and publishing the story object as a web page to a storage location on a web server associated with a URL, the published story object including the first set of graphical pages of the first version, at least one of the first graphical page and the alternative first graphical page, and the action element at the one or more graphical locations.

3. The method of claim 2, further comprising:

receiving, via the one or more application user interfaces, a second input defining the story object for a social media site;

receiving, via the one or more application user interfaces, a third input to publish the story object as the web page; and uploading the story object to the web server.

4. The method of claim 2, further comprising:

serving the first graphical page of the published story object to a second client computing device of a second user;

providing, for display on the second client computing device, the action element at the one or more graphical locations on the first graphical page;

receiving a second input from the second user interacting with the action element;

based on the second input, providing the first action-information region for display to the second user;

receiving a third input from the second user interacting with the first action-information region; and automatically performing a first operation based on the third input including providing the second action-information region for display on the second client computing device.

5. The method of claim 4, further comprising:

receiving, via the one or more application user interfaces, a fourth input from the first user defining the action element in association with a second graphical page of the story object;

associating the action element with a second graphical location on the second graphical page of the story object; and generating the first action-information region for the action element associated with the second graphical page based on the fourth input.

6. The method of claim 5, further comprising:

serving the second graphical page of the published story object to a third client computing device of a third user;

providing, for display on the third client computing device, the action element on the second graphical page at the second graphical location;

receiving a fifth input from the third user interacting with the action element;

based on the fifth input, providing the first action-information region for display to the third user;

receiving a sixth input from the third user interacting with the first action-information region;

automatically performing a second operation based on the sixth input; and analyzing the sixth input against the third input.

7. The method of claim 6, further comprising:

presenting, via the one or more application user interfaces, the alternative first graphical page as the second graphical page, the first graphical page and the alternative first graphical page being alternatively presented when serving the published story object based on a bandwidth used by one or more of the first graphical page and the alternative first graphical page.

8. The method of claim 4, further comprising:
authenticating access to the first graphical page of the published story object by the second client computing device of the second user.

9. The method of claim 2, wherein:
the first action-information region includes a gateway via which a product graphically represented at the one or more graphical locations of the first graphical page may be acquired, the first action-information region being displayed in an overlay over the first graphical page, and
the first action-information region causes one or more of redirecting a second client computing device of a second user to a separate web page, sending the product to the second user, and collecting information from the second user.

10. The method of claim 2, wherein:
receiving the first input from the first user defining the action element in association with the first graphical page of the story object includes receiving identifying information of a product and the one or more graphical locations of the action element relative to a content item on the first graphical page, and
generating the first action-information region for the action element includes automatically generating an affiliate link to an affiliate website for the product, the first action-information region including the identifying information of the product and providing a selectable element that activates the affiliate link.

11. The method of claim 2, wherein publishing the story object as the web page comprises:
converting the story object into one or more web documents, and
uploading the one or more web documents to the storage location.

12. The method of claim 11, further comprising:
updating a database to store a URL and story object metadata in association with the first user, wherein the story object metadata includes a user identifier of the first user, the URL, and one or more story publication parameters.

13. The method of claim 2, further comprising:
receiving a request for the web page at a proxy server;
determining the storage location based on the request; and
serving the web page from the storage location.

14. The method of claim 2, further comprising:
determining a nested relationship of the web page to a previously published web page; and
updating the previously published web page and the web page to include corresponding links reflecting the nested relationship.

15. The method of claim 2, further comprising:
analyzing one or more user interactions with the first action-information region by one or more users; and
displaying, on a client device of the one or more users, one of multiple versions of the first graphical page as part of the published story object based on the analysis of the one or more user interactions, the one of the multiple versions being selected from the first graphical page and the alternative first graphical page based on the analysis of the one or more user interactions.

16. A system comprising:
a processor; and
a memory storing instructions that, when executed by the processor, cause the system to:
present one or more application user interfaces for display to a first user on a first client computing device;
generate, responsive to a first input from the first user via the one or more application user interfaces, an action element in association with a first graphical page and an alternative first graphical page of a story object, the story object including a plurality of graphical pages having a defined sequential order, the plurality of graphical pages including:
a first version of a first set of graphical pages, and
the first graphical page or the alternative first graphical page displayable at a defined point in the sequential order among the first set of graphical pages of the first version, the alternative first graphical page being displayed instead of the first graphical page at the defined point in the sequential order based on a determined criterion;
associate the action element with one or more graphical locations on the first graphical page and the alternative first graphical page of the story object;
generate a first action-information region and a second action-information region at the one or more graphical locations based on the first input, the first action-information region being displayable based on a first interaction with the action element and the second action-information region being displayable based on a second interaction with the first action-information region; and
publish the story object as a web page to a storage location on a web server associated with a URL, the published story object including the first set of graphical pages of the first version, at least one of the first graphical page and the alternative first graphical page, and the action element at the one or more graphical locations.

17. The system of claim 16, wherein the instructions further cause the system to:
receive, via the one or more application user interfaces, a second input defining the story object for a social media site;
receive, via the one or more application user interfaces, a third input to publish the story object as the web page; and
upload the story object to the web server.

18. The system of claim 16, wherein the instructions further cause the system to:
serve the first graphical page of the published story object to a second client computing device of a second user;
provide, for display on the second client computing device, the action element at the one or more graphical locations on the first graphical page;
receive a second input from the second user interacting with the action element;
based on the second input, provide the first action-information region for display to the second user;
receive a third input from the second user interacting with the first action-information region; and
automatically perform a first operation based on the third input including providing the second action-information region for display on the second client computing device.

19. The system of claim 18, wherein the instructions further cause the system to:

receive, via the one or more application user interfaces, a fourth input from the first user defining the action element in association with a second graphical page of the story object;

associate the action element with a second graphical location on the second graphical page of the story object; and generate the first action-information region for the action element associated with the second graphical page based on the fourth input.

20. The system of claim 19, wherein the instructions further cause the system to:

serve the second graphical page of the published story object to a third client computing device of a third user;

provide, for display on the third client computing device, the action element on the second graphical page at the second graphical location;

receive a fifth input from the third user interacting with the action element;

based on the fifth input, provide the first action-information region for display to the third user;

receive a sixth input from the third user interacting with the first action-information region;

automatically perform a second operation based on the sixth input; and analyze the sixth input against the third input.

\* \* \* \* \*